US00RE42589E

(19) United States
(12) Reissued Patent
Tinker et al.

(10) Patent Number: US RE42,589 E
(45) Date of Reissued Patent: Aug. 2, 2011

(54) ENHANCED MPEG INFORMATION DISTRIBUTION APPARATUS AND METHOD

(75) Inventors: Michael Tinker, Yardley, PA (US); Jeremy D. Pollack, Kingston, NJ (US); Glenn Arthur Reitmeier, Yardley, PA (US)

(73) Assignee: Akikaze Technologies, LLC, Wilmington, DE (US)

(21) Appl. No.: 11/635,063

(22) Filed: Dec. 7, 2006

Related U.S. Patent Documents

Reissue of:
(64) Patent No.: 6,829,301
Issued: Dec. 7, 2004
Appl. No.: 09/092,225
Filed: Jun. 5, 1998

U.S. Applications:
(63) Continuation-in-part of application No. 09/050,304, filed on Mar. 30, 1998, now Pat. No. 6,118,820.

(60) Provisional application No. 60/071,296, filed on Jan. 16, 1998, provisional application No. 60/071,294, filed on Jan. 16, 1998.

(51) Int. Cl.
*H04N 7/12* (2006.01)

(52) U.S. Cl. ..... 375/240.12; 375/240; 375/240.01; 375/E7.081; 375/E7.09; 375/E7.205

(58) Field of Classification Search ..... 375/240, 375/240.01, 240.11, 240.12, 240.13, 240.16, 375/E7.081, E7.09, E7.205
See application file for complete search history.

(56) References Cited

U.S. PATENT DOCUMENTS

| | | | | |
|---|---|---|---|---|
| 4,845,560 | A | 7/1989 | Kondo et al. | |
| 4,947,447 | A | 8/1990 | Miyaoka et al. | |
| 4,982,290 | A | 1/1991 | Nishi et al. | |
| 5,023,710 | A | 6/1991 | Kondo et al. | |
| 5,049,990 | A | 9/1991 | Kondo et al. | 375/240.24 |
| 5,070,402 | A | 12/1991 | Ishii et al. | |
| 5,121,205 | A | 6/1992 | Ng et al. | 430/531 |
| 5,307,177 | A | 4/1994 | Shibata et al. | |
| 5,374,958 | A | 12/1994 | Yanagihara | |
| 5,392,072 | A | 2/1995 | Rodriguez et al. | |
| 5,412,428 | A | 5/1995 | Tahara | 375/240.25 |
| 5,486,929 | A | 1/1996 | Heyl | 386/13 |
| 5,497,246 | A | 3/1996 | Abe | 382/252 |
| 5,526,131 | A | 6/1996 | Strolle et al. | 386/112 |

(Continued)

FOREIGN PATENT DOCUMENTS

EP 0 649 261 4/1995

(Continued)

OTHER PUBLICATIONS

Chen, T. et al.: "Coding of Subregions Content-Based Scalable Video," *IEEE Transactions on Circuits and Systems for Video Technology*, Feb. 1, 1997, 7(1), 256-260.

(Continued)

*Primary Examiner* — Allen Wong
(74) *Attorney, Agent, or Firm* — Woodcock Washburn LLP

(57) ABSTRACT

A method and concomitant apparatus for compressing, multiplexing and, in optional embodiments, encrypting, transporting, decrypting, decompressing and presenting high quality video information in a manner that substantially preserves the fidelity of the video information in a system utilizing standard quality circuits to implement high quality compression, transport and decompression.

86 Claims, 7 Drawing Sheets

U.S. PATENT DOCUMENTS

| | | | | |
|---|---|---|---|---|
| 5,541,739 | A | | 7/1996 | Tanaka ..... 386/39 |
| 5,589,993 | A | | 12/1996 | Naimpally ..... 386/81 |
| 5,610,998 | A | | 3/1997 | Kondo |
| 5,612,748 | A | | 3/1997 | Gohshi et al. ..... 375/240.21 |
| 5,757,855 | A | | 5/1998 | Strolle et al. |
| 5,764,805 | A | | 6/1998 | Martucci et al. |
| 5,790,206 | A | | 8/1998 | Ju |
| 5,809,175 | A | | 9/1998 | Kondo |
| 5,848,220 | A | | 12/1998 | Henmi et al. ..... 386/109 |
| 6,025,878 | A | * | 2/2000 | Boyce et al. ..... 375/240.16 |
| 6,037,984 | A | | 3/2000 | Isnardi et al. |
| 6,040,867 | A | | 3/2000 | Bando et al. |
| 6,084,908 | A | | 7/2000 | Chiang et al. |
| 6,084,912 | A | | 7/2000 | Reitmeier et al. |
| 6,118,820 | A | | 9/2000 | Reitmeier et al. |
| 6,125,146 | A | | 9/2000 | Frencken et al. |
| 6,208,745 | B1 | | 3/2001 | Florencio et al. |
| 6,560,285 | B1 | | 5/2003 | Reitmeier et al. |
| 6,829,301 | B1 | | 12/2004 | Tinker et al. |
| 7,403,565 | B2 | | 7/2008 | Reitmeier et al. |

FOREIGN PATENT DOCUMENTS

| | | | |
|---|---|---|---|
| EP | 0 649 261 | A2 | 4/1995 |
| EP | 0 649 261 | A3 | 4/1995 |
| EP | 0 630 158 | | 5/1999 |
| EP | 1 050 167 | | 12/2008 |
| JP | 4-185172 | A | 7/1992 |
| WO | WO 97/17669 | | 5/1997 |
| WO | WO 97/47139 | | 12/1997 |
| WO | WO 99/37096 | | 7/1999 |
| WO | WO 99/37097 | | 7/1999 |
| WO | WO 00/64185 | | 10/2000 |

OTHER PUBLICATIONS

PCT International Search Report dated Apr. 16, 1999 in corresponding International Application No. PCT/US99/00351.

PCT International Search Report dated Apr. 16, 1999 in corresponding International Application No. PCT/US99/00352.

PCT International Preliminary Examination Report dated Jun. 6, 2000 from corresponding International Application No. PCT/US99/00352.

EP Communication issued by the Examining Division on May 30, 2003 from corresponding EP Application No. EP99902105.8.

EP Communication issued by the Examining Division on Apr. 20, 2004 from corresponding EP Application No. EP99902105.8.

* cited by examiner

ENHANCED MPEG INFORMATION DISTRIBUTION APPARATUS AND METHOD

Matter enclosed in heavy brackets [ ] appears in the original patent but forms no part of this reissue specification; matter printed in italics indicates the additions made by reissue.

[This application claims benefit of U.S. Provisional Patent Applications Ser. Nos. 60/071,294 and 60/071,296, each filed Jan. 16, 1998, and 60/079,824 filed on Mar. 30, 1998. This application is a continuation-in-part of application Ser. No. 09/050,304 filed Mar. 30, 1998.] *This current application Ser. No. 11/635,063 claims benefit of U.S. Provisional Patent Applications Ser. Nos. 60/071,294 and 60/071,296, each filed Jan. 16, 1998, and 60/079,824 filed on Mar. 30, 1998. This current application Ser. No. 11/635,063 is a reissue application of U.S. application Ser. No. 09/092,225 filed Jun. 5, 1998, now U.S. Pat. No. 6,829,301 issued Dec. 7, 2004, which claims benefit of U.S. Provisional Patent Application Ser. No. 60/079,824 filed on Mar. 30, 1998. The U.S. application Ser. No. 09/092,225 is a continuation-in-part of application Ser. No. 09/050,304 filed Mar. 30, 1998, now U.S. Pat. No. 6,118,820 issued on Sep. 12, 2000, which U.S. application Ser. No. 09/050,304 claims benefit of U.S. Provisional Patent Applications Ser. Nos. 60/071,294 and 60/071,296, each filed Jan. 16, 1998.*

The invention relates to communications systems generally and, more particularly, the invention relates to an MPEG-like information distribution system providing enhanced information quality and security.

BACKGROUND OF THE DISCLOSURE

In some communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

In the context of digital video processing and digital image processing, information such as pixel intensity and pixel color depth of a digital image is encoded as a binary integer between 0 and $2^{n-1}$. For example, film makers and television studios typically utilize video information having 10-bit pixel intensity and pixel color depth, which produces luminance and chrominance values of between zero and 1023. While the 10-bit dynamic range of the video information may be preserved on film and in the studio, the above-referenced standards (and communication systems adapted to those standards) typically utilize a dynamic range of only 8-bits. Thus, the quality of a film, video or other information source provided to an ultimate information consumer is degraded by dynamic range constraints of the information encoding methodologies and communication networks used to provide such information to a consumer.

Therefore, it is seen to be desirable to provide a method and apparatus to preserve the dynamic range of film, video and other forms of relatively high dynamic range information that are encoded and transported according to relatively low dynamic range techniques. Moreover, it is seen to be desirable to provide such dynamic range preservation while utilizing economies of scale inherent to these relatively low dynamic range techniques, such as the above-referenced MPEG-like standards and techniques.

SUMMARY OF THE INVENTION

The invention provides a low cost method and apparatus for compressing, multiplexing and, in optional embodiments, encrypting, transporting, decrypting, decompressing and presenting high quality video information in a manner that substantially preserves the fidelity of the video information. In addition, standard quality circuits are used in a manner implementing, e.g., a high quality compression apparatus suitable for use in the invention. In optionally embodiments, preprocessing techniques are used to extend the apparent dynamic range of the standard compression, transport and decompression systems utilized by the invention.

Specifically, an apparatus according to the invention is suitable for use in a system for distributing a video information signal comprising a plurality of full dynamic range components and comprises: a compression encoder, for compression encoding the video information signal in a manner substantially retaining the full dynamic range of the full dynamic range components, the compression encoder comprising at least two standard encoders, each of the standard encoders being responsive to up to three component video signals, each of the standard compression encoders tending to substantially preserve a dynamic range and spatial resolution of only one component of the video signal, each of the standard compression encoders providing a compressed output video signal; and a multiplexer, for multiplexing the compressed output video signals of the two or more standard compression encoders to produce a multiplexed information stream.

In another embodiment of the invention, each of three standard YUV-type MPEG encoders (e.g., 4:2:0 or 4:2:2) is used to encode a respective one of three component video signals utilizing only a luminance encoding portion of the encoder. A standard transport system delivers the three encoded component video signals to three standard YUV-type MPEG decoders (e.g., 4:2:0 or 4:2:2), which are each used to decode a respective encoded component video signal utilizing a luminance decoding portion of the decoder.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in any information processing system in which high fidelity information is processed and transported using processing and transport techniques that typically cause a reduction in fidelity. An embodiment of the invention will be described within the context of a secure, high quality information distribution system suitable for distributing, e.g., motion pictures and other high quality audio-visual programming to, e.g., movie theaters. However, the scope and teachings of the invention have much broader applicability and, therefore, the invention should not be construed as being limited to the disclosed embodiments.

Figure 1:
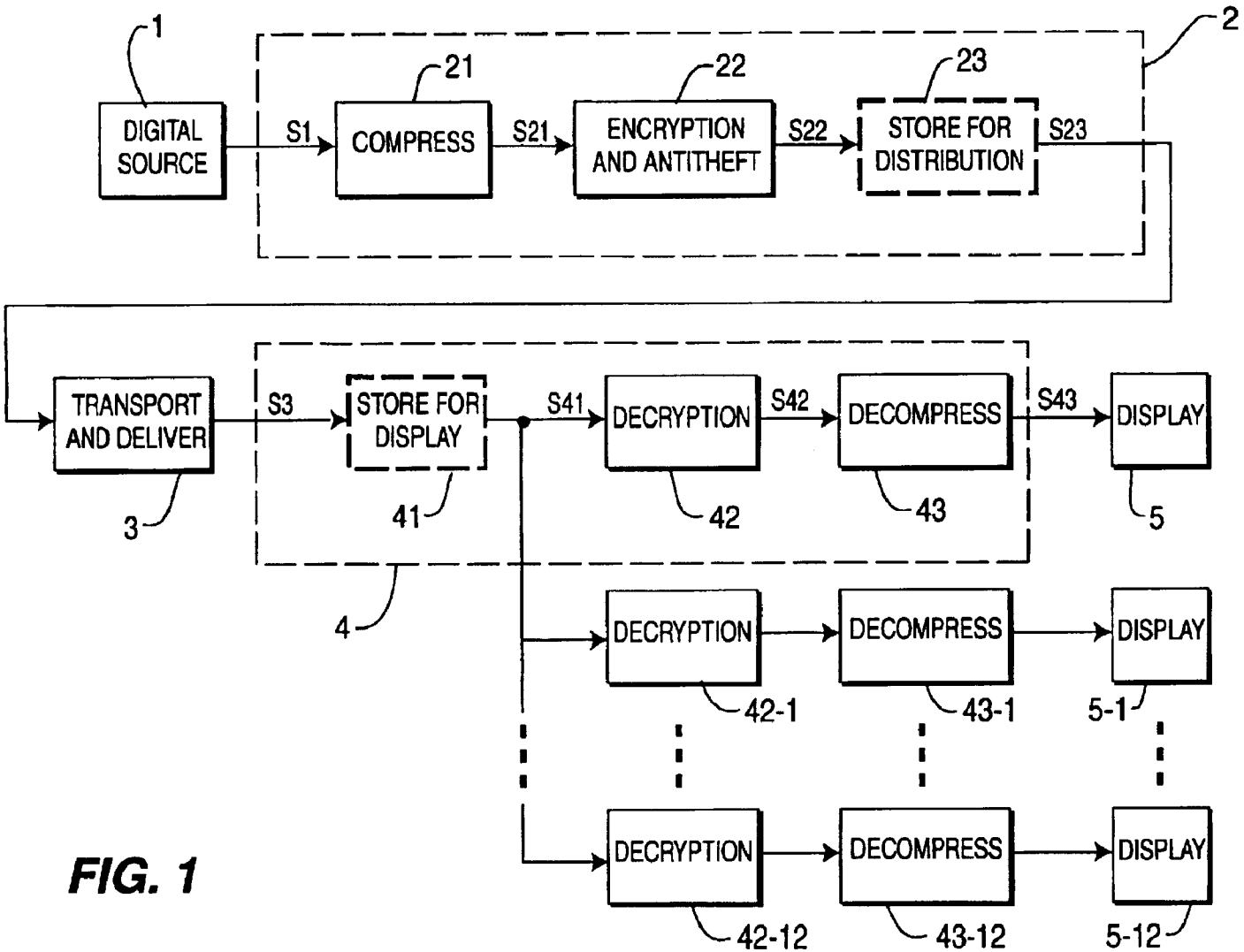
FIG. 1 depicts a high level block diagram of an audio-visual information delivery system.

FIG. 1 depicts a high fidelity information delivery system and method Specifically, FIG. 1 depicts a high level block diagram of a high fidelity information delivery system and method suitable for compressing and securing a high fidelity information stream, illustratively an audio-visual information stream; transporting the secure, compressed audio-visual information to an information consumer utilizing standard techniques; and unlocking and decompressing the transported stream to retrieve substantially the original high fidelity audio-visual information stream.

In the system and method of FIG. 1, a digital source 1 provides a digital information stream S1, illustratively a high fidelity audio-visual information stream, to a pre-transport processing function 2. The pre-transport processing function 2 comprises a compression function 21, an encryption and anti-theft function 22 and, optionally, a store for distribution function 23 to produce an information stream S23. A transport and delivery function 3 distributes the information stream S23 to a post-transport processing function 4. The post-transport processing function 4 comprises an optional store for display function 41, a decryption function 42 and a decompression function 43 to produce an output information stream S43. The output information stream S43 is coupled to a presentation device 5, illustratively a display device.

The system and method of FIG. 1 will now be described within the context of a secure, high quality information distribution system suitable for distributing, e.g., motion pictures and other high quality audio-visual programming to, e.g., movie theaters. First, the appropriate fidelity and security parameters of the system will be discussed. Second, the realization of the fidelity and security parameters by the system will be discussed. Finally, specific implementations of system components will be discussed.

As a practical matter, consumer enthusiasm for theater presentation of audiovisual programming, such as movies, is strongly related to the quality (in the fidelity sense of the audio and video presentation. Thus, in a world of high definition television (HDTV) at home, the quality of the video and audio presented to consumers by a theater, cinema or other venue should be superior to the HDTV experience the home. Moreover, since theater owners and copyright holders benefit by restricting or controlling parameters related to the programming (e.g., ensuring secure delivery of the programming, limited venues, presentation times or number of presentations and the like), the implementation of various distribution and security features is desirable.

Figure 2:
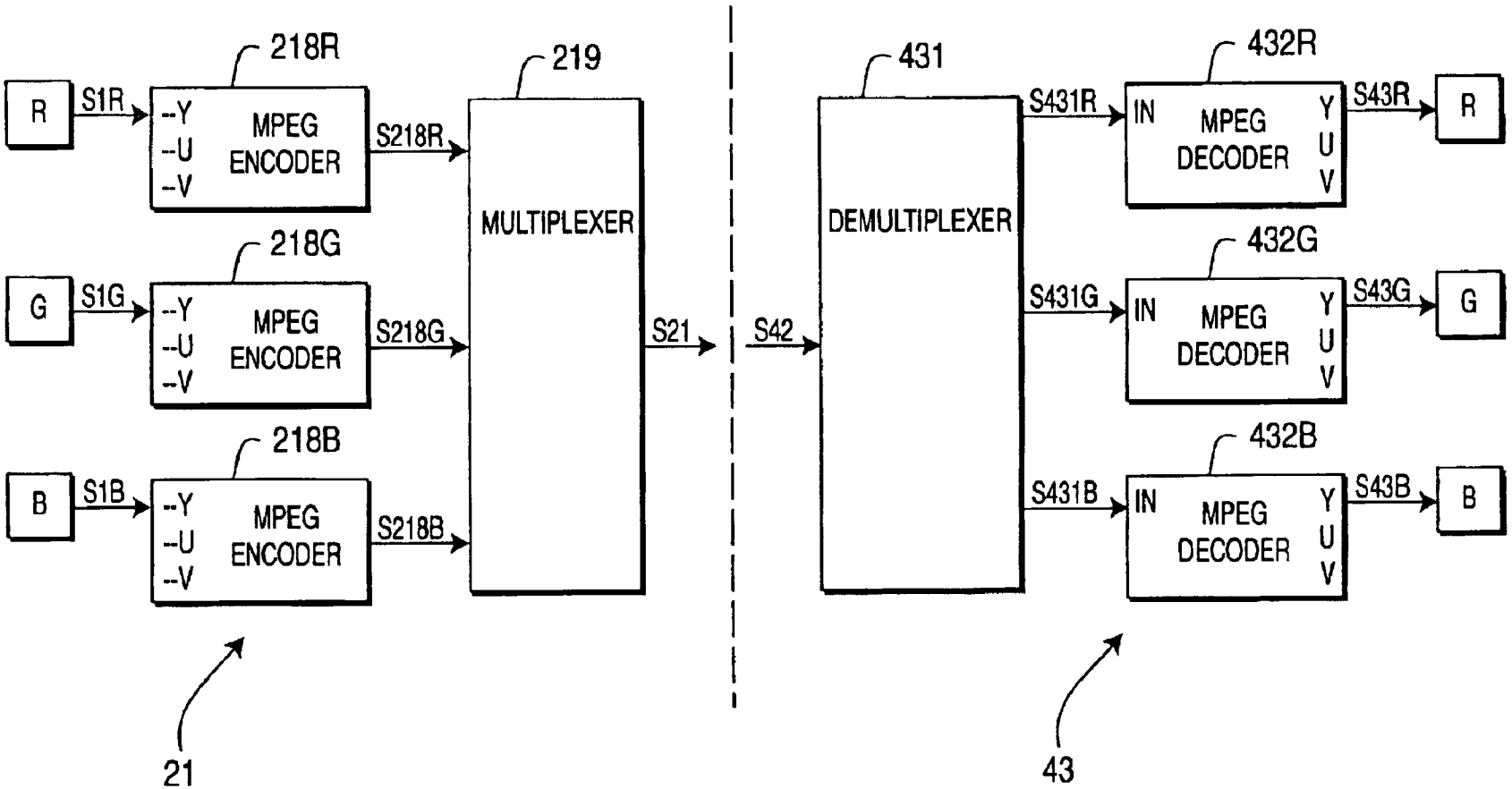
FIG. 2 depicts a high level block diagram of a video compression unit and a video decompression unit and suitable for use in the audio-visual information delivery system of FIG. 1.

To provide adequate video fidelity, one embodiment of the system and method of FIG. 1 utilizes compression coding at the component level (i.e., RGB) rather than at the color difference level (i.e., YUV). This embodiment will be discussed in more detail below with respect to FIG. 2, Briefly, the embodiment of FIG. 2 provides compression coding that preserves 4:4:4 resolution video, rather than the 4:2:0 resolution video typically used in MPEG systems.

The MPEG 8-bit 4:4:4 resolution produces results that are adequate for some applications of the invention. For those applications requiring a higher degree of fidelity, the invention preferentially utilizes an effective color depth that is greater than the 8-bit color depth typical of MPEG systems, such as a color depth of at least 10 bits log per primary color. To achieve enhanced color depth (i.e., greater than 8-bits) using standard 8-bit MPEG components (decoders, encoders and the like), additional pre-encoding and/or post-decoding processing may be utilized, as will now be explained.

Another embodiment of the system and method of FIG. 1 utilizes regional pixel-depth compaction techniques for preserving the dynamic range of a relatively high dynamic range signal. A regional pixel depth compaction method and apparatus suitable for use in the method and system of FIG. 1 is described in more detail below with respect to the enhanced MPEG encoder of FIG. 6, and in co-pending U.S. patent Application Ser. No. 09/050,304, filed on Mar. 30, 1998, and Provisional U.S. Patent Application No. 60/071,294, filed on Jan. 16, 1998, both of which are incorporated herein by reference in their entireties. Briefly, the described method and apparatus segments a relatively high dynamic range signal into a plurality of segments (e.g., macroblocks within a video signal); determines the maximum and minimum values of a parameter of interest (e.g., a luminance, chrominance or motion vector parameter) within each segment, remaps each value of a parameter of interest to, e.g., a lower dynamic range defined by the maximum and minimum values of the parameter of interest; encodes the remapped segments in a standard (e.g., lower dynamic range) manner; multiplexes the encoded remapped information segments and associated maximum and minimum parameter values to form a transport stream for subsequent transport to a receiving unit, where the process is reversed to retrieve the original, relatively high dynamic range signal. A technique for enhancing color depth on a regional basis can be used as part of the digitizing step to produce better picture quality in the images and is disclosed in the above-referenced Provisional U.S. patent application.

Another aspect of the system of FIG. 1 is the facilitation of a moderate level of random access into at least the unencrypted information stream (e.g., to insert advertisements, coming attraction trailers and the like), by including limited (e.g., every minute) random access points within the stream. Such random access points may be provided in a standard manner as described in, e.g., the MPEG specifications.

Another aspect of the system 100 of FIG. 1 is the use of high quality encoding for all frame rates, including the standard film frame rates or 24 Hz and 25 Hz. The system 100 utilizes a high bandwidth (e.g., 40 Mbits/sec) compression encoding and decoding scheme. Moreover, the system is capable of compressing, decompressing, and displaying any aspect ratio within the capabilities of the encoder and/or decoder employed by the invention, without needlessly compressing lines outside the original images. Moreover, it should be clearly understood that in the event a particular aspect ratio is not within the capabilities of an encoder and/or decoder, known "letterbox" and other image cropping techniques may be used. The system is also capable of decompressing in real time a very high resolution (e.g., 2000 pixels by 1000 pixels) moving picture having a high display rate such as 48 or 72 Hz (or the European 50 and 75 Hz). The bandwidth and resolution capabilities of the system are, of course, limited by the particular sub-system components used within the system, such as display device resolutions, transport systems and the like.

The system optionally utilizes motion estimation algorithms to reduce redundancy between images. Suitable motion estimation techniques are described in U.S. patent applications Ser. No. 08/612,005, filed Mar. 4, 1996; 08/735,869 (WIPO US 96/16956), filed Oct. 23, 1996; 60/048,181, (WIPO US 98/1056) filed May 30, 1997; 08/884,666, filed Jun. 27, 1997 and 08/735,871 (WIPO US 96/17045), filed Oct. 23, 1996, all of which are incorporated herein by reference in their entirety.

To ensure high fidelity audio, the system advantageously utilizes any standard audio format, such as 8-channel sound encoded with the image using 48 KHz audio sampling.

The digital source 1 comprises, illustratively, any source of high fidelity audio-visual information such as high-resolution digital video having a resolution suitable for use in, e.g., a movie theater. For example, moving images that originated on film may be scanned into electronic form using telecine or other known methods. Similarly, moving images may be initially captured with a camera having a sufficiently high resolution and color depth (i.e., resolution and color depth approximating film), or scanned electronically from an existing video source or file.

The pre-transport processing function 2 of the system 100 of FIG. 1 receives and processed the digital information stream S1 to produce a pre-transport information stream S22. The pre-transport information stream S22 may be coupled directly to the transport and deliver function 3 for transport packaging and delivery. Optionally, the pre-transport information stream S22 may be coupled to a store for distribution unit, illustratively a hard disk array, for storage prior to subsequent distribution via the transport and deliver function 3. The pre-transport information stream S22 may comprise, e.g., a packetized elementary stream, a transport stream or an asynchronous transfer mode (ATM) stream. The pre-transport information stream S22 may also comprise a TCP/IP stream.

The compression unit 21 compression encodes the high dynamic range information stream S1, illustratively a video stream, at a "film image" quality (i.e., preserve the dynamic range of the film) to produce a compressed information stream S21. Several embodiments of compression unit 21 will be described below with respect to FIGS. 2 and 3. When the compressed information stream S21 is subsequently decompressed by the decompression unit 43, substantially the entire bandwidth of the initial video or other high dynamic range information source will be retrieved. It must be noted that compression technologies such as MPEG were designed particularly for video compression and use color spaces, e.g., YUV, specifically used in the video realm, as opposed to the film realm. In particular, various constraints that apply to video do not apply to film or electronic film equivalents, and, therefore, these current standard video compression formats are not necessarily appropriate for the compression of digital images associated with film.

The encryption and anti-theft unit 22 encrypts the compressed information stream S21 to produce an encrypted information stream S22. The encryption and anti-theft unit 22 is specifically designed to thwart piracy of high dynamic range information streams, such motion picture information streams. The encryption and anti-theft unit 22 addresses piracy in two ways, watermarking and encryption.

Watermarking methods and apparatus suitable for use in the encryption and anti-theft unit 22 are disclosed in U.S. patent application Ser. No. 09/001,205, filed on Dec. 30, 1997, and U.S. patent application Ser. No. 08/997,965, filed on Dec. 24, 1997, both of which are incorporated herein by reference in their entireties. The disclosed watermarking methods and apparatus are used to modify the compressed information streams to allow identification of, e.g., the source of the stream. In this manner, a stolen copy of a motion picture may examined to determine, e.g., which distribution channel (or which distributor) lost control of the motion picture.

Standard encryption methods and apparatus may be used in the encryption and anti-theft unit 22. Such methods include, e.g., dual key encryption and other methods that are directed toward preventing utilization of the underlying, protected data. In this manner, even in the event of theft, a motion picture cannot be displayed without the original owners' permission (i.e., the decryption key). Thus, motion pictures may be securely transmitted by electronic means, obviating the present practice of physically transported motion pictures in bulky packages that are secured only by purely physical means.

The optional store for distribution unit 23 is provides temporary storage of the compressed and/or encrypted moving pictures prior to transmission/transport of the compressed and encrypted moving pictures to an end user, such as a movie theater. The optional store for distribution unit 23 may be implemented using any media suitable for computer material, such as hard disks, computer memory, digital tape and the like. An apparatus for partial response encoding on magnetic media may be used to increase the amount of storage on computer disks and tapes, and hence lower the cost of the media necessary for storage of digitized moving pictures. Such an apparatus is described in U.S. patent application Ser. No. 08/565,608, filed on Nov. 29, 1995, and incorporated herein by reference in its entirety.

The transport and delivery function 3 distributes the information stream S23 to a post-transport processing function 4. Because of the digital nature of the images that are encoded and encrypted by the system, transport and delivery function 3 may be implemented in a manner that cannot be used for moving pictures on film. For example, the transport and delivery function 3 may be implemented using a digital storage medium for physically transporting the data to, e.g., a theater. In this case, the physical medium is less bulky than film while providing the security of encryption and watermarking. The transport and delivery function 3 may also be implemented using an electronic communications medium (e.g., public or private communications network, satellite link, telecom network and the like), for electronically transporting the data from the point of distribution to the theater. In this case there is no physical storage medium transported between sites. The transport and delivery function 3 may be implemented using a communications system comprising one or more of, a satellite link, a public or private telecommunications network, a microwave link or a fiber optic link. Other types of communications links suitable for implementing the transport and delivery function 3 are known to those skilled in the art.

The post-transport processing function 4, which comprises the optional store for display function 41, decryption and anti-theft function 42 and decompression function 43, produces an output information stream S43 that is coupled to a presentation device 5, illustratively a display device.

The optional store for display function 41 is used for, e.g., in-theater storage of a transported motion picture representative information stream. Due to the digital nature of the transported information stream, the storage is much more secure, much less bulky, and much more robust than film. All the films showing at a theater may be stored in single place and displayed at any time through any projector (e.g., presentation device 5) in the theater simply by running the necessary cables. The same server technology used for the optional store for distribution function 23 may be used for the store for display function 41. When used, the optional store for display function 41 couples stored information streams to the decryption and anti-theft unit 42 as stream S41.

Standard decryption methods and apparatus may be used in the decryption and anti-theft unit 42, as long as they are compatible with the encryption methods and apparatus used in the encryption and anti-theft unit 22. That is, the encrypted and compressed moving pictures must be decrypted and decompressed at the theater in order for them to be displayed to an audience. The decryption and anti-theft unit 42 produces a decrypted information stream S42 that is coupled to the decompression function 43.

A preferred decryption method utilizes certificates and trusted authorities to ensure that the digital form of the moving picture will be unintelligible to any person or device that attempts to use it without the proper authority. No unauthorized user is able to decrypt the bits of the moving picture without the appropriate key or keys, land these will be available only to appropriately authorized theaters or other venues. Thus, stealing the digital form of the moving picture itself will be of no use to a thief, because it will be impossible to display without the appropriate decryption keys. As previously discussed, an additional layer of security is provided by the use of watermarks in the digital bitstream, so that in the event of piracy, a stolen copy and its source may be readily identified. Because the watermarks are put into the compressed bitstream, it will be possible to put different watermarks into each bitstream, so that each copy that is sent out can be uniquely identified.

The decompression function 43 decompresses the motion picture (or other information stream) in real time and couples a decompressed information stream S43 to the presentation unit 5. The decompression function 43 and presentation function 5 may be integrated to form a self-contained, combined decompression function 43 and presentation function 5. In this manner, there is no opportunity to record or capture the decompressed images on any medium, since the self-contained, combined decompression function 43 and presentation function 5 has no output other than the images themselves. This is very important for the protection of the material in the digitized movie so that illegal electronic copies of the original cannot be made and displayed.

The presentation unit 5 may comprise a projector that takes RGB inputs of the dynamic range output by the system and displays those colors faithfully and, as closely as possible, with the full contrast and brightness range of the original image.

FIG. 1 also depicts additional decryption and anti-theft units 42-1 through 42-n, additional decompression functions 43-1 through 43-n and additional presentation units 5-1 through 5-n. As shown in FIG. 1, each of the additional decryption and anti-theft units 42-1 through 42-n are coupled to receive the same signal S41 from optional store for display unit 41. Such an arrangement is suitable for use in, illustratively, a multiple screen (i.e., display device 5) theater simultaneously presenting a first run movie on multiple screens. In normal operation, since a different movie is presented on each additional screen, each screen is supported by a respective decryption function and decompression function. Thus, store for display unit 41 may be used to provide a separate output signal (not shown) for each additional decryption and anti-theft unit 42-1 through 42-n.

Figure 3:
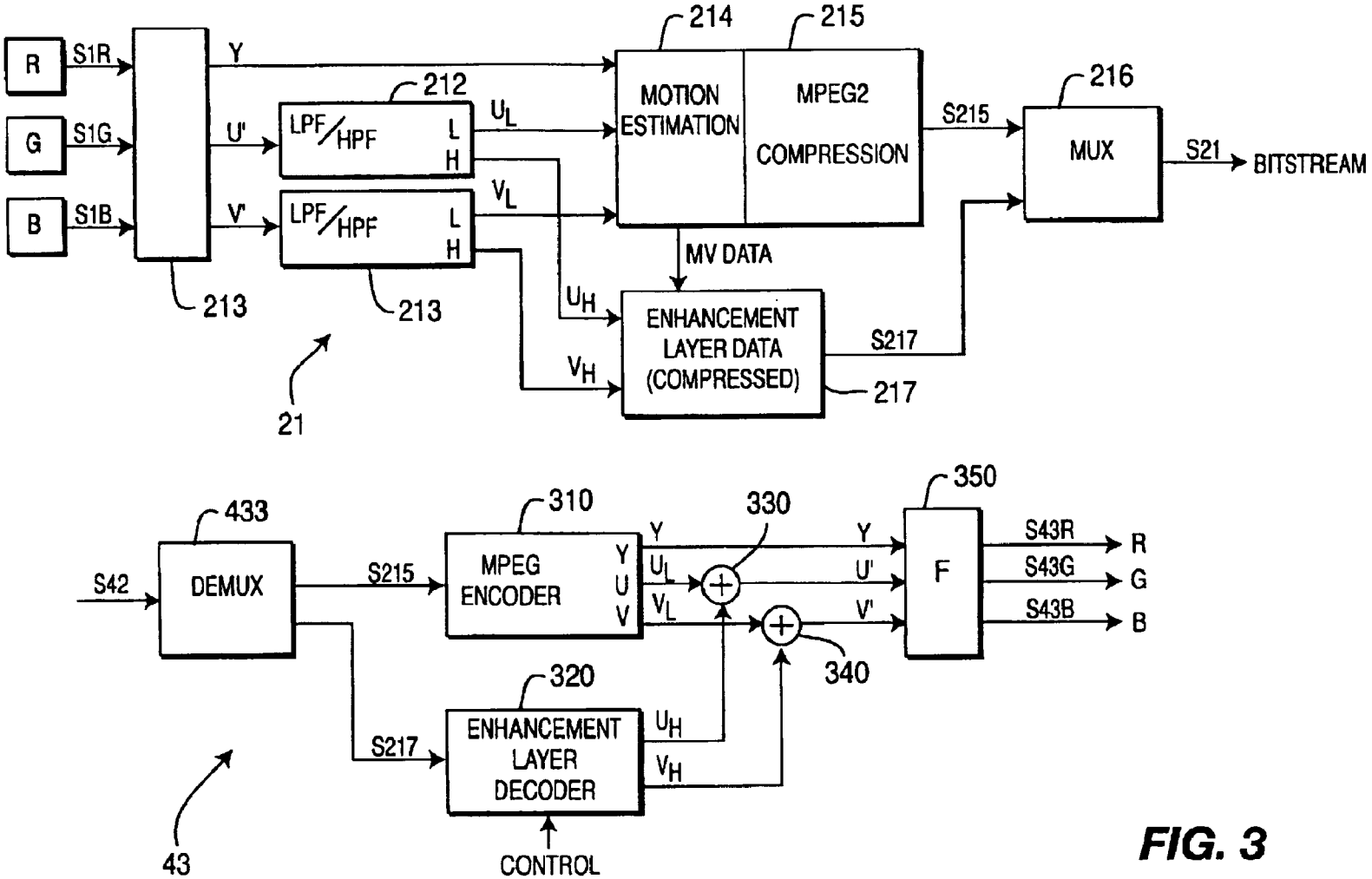
FIG. 3 depicts a high level block diagram of an alternate embodiment of a video compression unit and a video decompression unit and suitable for use in the audio-visual information delivery system of FIG. 1.
Figure 4:
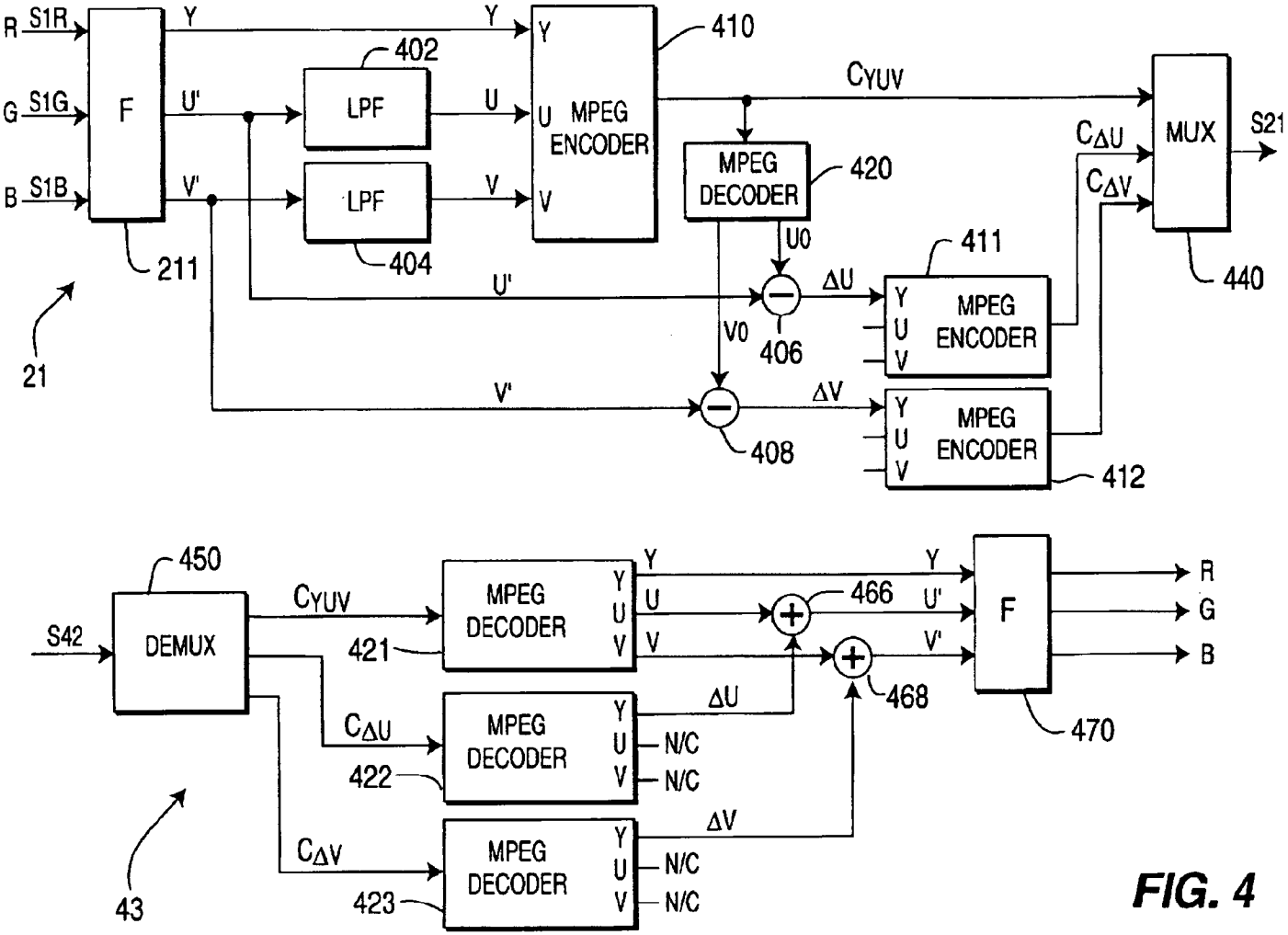
FIG. 4 depicts a high level block diagram of an alternate embodiment of a video compression unit and a video decompression unit and suitable for use in the audio-visual information delivery system of FIG. 1.

FIGS. 2-4 depict respective high level block diagrams of a video compression unit 21 and a video decompression unit 43 suitable for use in the audio-visual information delivery system of FIG. 1. It must be noted that each embodiment advantageously leverages existing technology to encode and decode electronic cinema quality video information. For example, existing MPEG encoders typically utilize YUV space, decimating the U and V channels and encoding the decimated U and V channel information at a much lower bandwidth than the Y channel information (e.g., the known 4:2:0 video format). Similarly, existing MPEG decoders typically decode the 4:2:0 format encoded video to produce full bandwidth Y channel and decimated U and V channel video. Thus, utilizing the below embodiments of the invention, high dynamic range information, such as electronic cinema information, may be economically encoded, transported in a normal manner, and decoded without losing any dynamic range. It must be noted that several encoders and/or decoders may, of course, be used to form a single integrated circuit utilizing known semiconductor manufacturing techniques.

FIG. 2 depicts a high level block diagram of a video compression unit 21 and a video decompression unit 43 according to the invention and suitable for use in the audio-visual information delivery system of FIG. 1. Specifically, the video compression unit 21 depicted in FIG. 2 comprises three standard MPEG encoders 218R, 218G and 218B and a multiplexer 219. Similarly, the video decompression unit 43 depicted in FIG. 2 comprises a demultiplexer 431 and three standard MPEG decoders 432R, 432G and 432B.

Referring now to the video compression unit 21, a full depth (i.e., full dynamic range) red S1R input video signal is coupled to a luminance input of the first standard MPEG encoder 218R; a full depth blue S1B input video signal is coupled to a luminance input of the second standard MPEG encoder 218B; and a full depth green S1G input video signal is coupled to an input of the third standard MPEG encoder 218G.

Each of the standard MPEG encoders 218R, 218G and 218B produces a respective full depth compressed output signal S218R, S218G and S218B that is coupled to the multiplexer 219. The multiplexer 219 multiplexes the encoded, full depth compressed video output signals S218R, S218G and S218B to form the compressed bitstream S21.

It must be noted that the standard MPEG encoders 218R, 218G and 218B are typically used to encode YUV space video having a 4:2:0 resolution. That is, the encoders are typically used to provide full resolution encoding of the luminance channel and reduced resolution encoding of the chrominance channels. Thus, by utilizing only the luminance portion of MPEG encoders 218R, 218G and 218B, the video compression unit 21 of FIG. 2 provides full depth encoding (in RGB space) of the luminance and chrominance information. It should also be noted that there exists MPEG decoders providing RGB output signals in response to encoded input streams do exist. However, such decoders typically cost more and provide insufficient resolution.

Referring now to the video decompression unit 43, the demultiplexer 431 receives a compressed bitstream S42 corresponding to the compressed bitstream S21. The demultiplexer extracts from the compressed bitstream S42 three full depth compressed video streams S431R, S431B and S431G corresponding to the full depth compressed video streams S218R, S218G and S218B. The full depth compressed video streams S431R, S431B and S431G are coupled to a luminance input of, respectively, standard MPEG decoders 432R, 432G and 432B. The standard MPEG decoders 432R, 432G and 432B responsively produce, respectively, a full depth red S43R video signal, a full depth blue S43B video signal and a full depth green S43G video signal.

It must be noted that the standard MPEG decoders 432R, 432G and 432B are typically used to decode YUV space video having a 4:2:0 resolution. Thus, by utilizing only the luminance portion of MPEG encoders 432R, 432G and 432B, the video decompression unit 43 of FIG. 2 provides full depth decoding (in RGB space) of the luminance and chrominance information initially provided to the video compression unit 21. In this manner, the embodiments of the video compression unit 21 and video decompression unit 43 depicted in FIG. 2 provide economical implementation of an electronic cinema quality encoding, transport and decoding functions.

FIG. 3 depicts a high level block diagram of an alternate embodiment of a video compression unit 21 and a video decompression unit 43 according to the invention and suitable for use in the audio-visual information delivery system of FIG. 1. Specifically, the video compression unit 21 depicted in FIG. 3 comprises a format converter 211, a pair of low pass/high pass filter complements (LPF/HPFs) 212 and 213, a motion estimation unit 214, an MPEG-2 compression unit 215, an enhancement layer data compression unit 217 and a multiplexer 216. Similarly, the video decompression unit 43 depicted in FIG. 3 comprises a demultiplexer 433, an MPEG decoder 310, and enhancement layer decoder 320, a first adder 330, a second adder 340 and a format converter 350.

The format converter 211 converts an input RGB video signal S1R, S1B and S1G into a full depth luminance signal Y, a first full depth color difference signal U' and a second full depth color difference signal V'. The first and second full depth color difference signals, U' and V', are coupled to, respectively, first and second low pass/high pass filter complements 212 and 213.

Each of the low pass/high pass filter complements 212 and 213 comprises, illustratively, a low pass digital filter and a complementary high pass digital filter. That is, the high frequency 3 dB roll-off frequency of the low pass digital filter is approximately the same as the low frequency 3 dB roll-off frequency of the high pass digital filter. The roll-off frequency is selected to be a frequency which passes, via the low pass digital filter, those frequency components normally associated with a standard definition chrominance signal. The roll-off frequency also passes, via the high pass digital filter, those additional frequency components normally associated with only a high definition chrominance signal.

The first low pass/high pass filter complement 212 and second low pass/high pass filter complement 213 produce, respectively, a first low pass filtered and decimated color difference signal $U_L$ and a second low pass filtered and decimated color difference signal $V_L$. The luminance signal Y, first low pass filtered color difference signal $U_L$ and second low pass filtered color difference signal $V_L$ are coupled to the motion estimation unit 214.

Those skilled in the art will know that certain phase compensation, delay and buffering techniques should be employed to compensate for, e.g., group delay and other filtering artifacts to ensure that the luminance signal Y, first low pass filtered color difference signal $U_L$ and second low pass filtered color difference signal $V_L$ are properly synchronized.

The full depth luminance Y, first color difference U' and second color difference V' signal form a video signal having a 4:4:4 resolution. By contrast, the luminance Y, first low pass filtered color difference $U_L$ and second low pass filtered color difference $V_L$ signals form a video signal having, illustratively, a standard MPEG 4:2:2 or 4:2:0 resolution. Thus, motion estimation unit 214 and MPEG2 compression unit 215 may be implemented in a known manner using, e.g., inexpensive (i.e., "off the shelf") components or cells for use in application specific integrated circuits (ASICs).

Motion estimation unit 214 and MPEG2 compression unit 215 produce at an output a compressed video stream S215 that is coupled to multiplexer 216. In addition, motion estimation unit 214 produces a motion vector data signal MV DATA indicative of the motion vectors for, e.g., each macroblock of the YUV video stream being estimated.

The first low pass/high pass filter complement 212 and second low pass/high pass filter complement 213 produce, respectively, a first high pass filtered color difference signal $U_H$ and a second high pass filtered color difference signal $V_H$. The first high pass filtered color difference signal $U_H$ and a second high pass filtered color difference signal $V_H$ are coupled to the enhancement layer data compression unit 217.

Enhancement layer data compression unit 217 receives the first high pass filtered color difference signal $U_H$, the second high pass filtered color difference signal $V_H$ and the motion vector data signal MV DATA. In response, the enhancement layer data compression unit 217 produces at an output an information stream S217 comprising an enhancement layer to the compressed video stream S215. The enhancement layer information stream S217 comprises high frequency chrominance information (i.e., $U_H$ and $V_L$) that corresponds to the standard frequency chrominance information (i.e., $U_L$ and $V_L$) within the compressed video stream S215. The motion vector information within the enhancement layer information stream S217, which is generated with respect to the standard frequency chrominance information (i.e., $U_L$ and $V_L$), is used to ensure that the spatial offsets imparted to the standard frequency components are also imparted to the corresponding high frequency components. The enhancement layer information stream S217 is coupled to multiplexer 216.

Multiplexer 216 multiplexes the compressed video stream S215 and the enhancement layer information stream S217 to form the compressed bitstream S21. In the embodiment of FIG. 3, the compressed video stream S215 comprises a standard MPEG2 stream. The enhancement layer information stream S217 is also compressed, using compression parameters from the MPEG compression, such as the illustrated motion vectors and, optionally, other standard MPEG compression parameters (not shown).

Referring now to the video decompression unit 43, the demultiplexer 433 receives a compressed bitstream S42 corresponding to the compressed bitstream S21. The demultiplexer 433 extracts, from the compressed bitstream S42, the compressed video stream S215 and the enhancement layer information stream S217. The compressed video stream S215 is coupled to MPEG decoder 310, while the enhancement layer of information stream S217 is coupled to the enhancement layer decoder 320.

MPEG decoder 310 operates in a standard manner to decode compressed video stream S215 to produce a luminance signal Y, a first standard resolution color difference signal $U_L$ and a second standard resolution color difference signal $V_L$. The first standard resolution color difference signal $U_L$ is coupled to a first input of first adder 330, while the second standard resolution color difference signal $V_L$ is coupled to a first input of second adder 340. The luminance signal Y is coupled to a luminance input of format converter 350.

Enhancement layer decoder 320 decodes the enhancement layer information stream S217 to extract the high frequency components of the first color difference signal $U_H$ and the second color difference signal $V_H$. The high frequency components of the first color difference signal $U_H$ are coupled to a second input of first adder 330, while the high frequency components of second color difference signal $V_H$ are coupled to a second input of second adder 340.

First adder 330 operates in a known manner to add the first standard resolution color difference signal $U_L$ and the high frequency components of the first color difference signal $U_H$ to produce full depth first color difference signal U'. Second adder 340 operates in a known manner to add the second standard resolution color difference signal V, and the high frequency components of the second color difference signal $V_H$ to produce full depth second color difference signal U'. The first full depth color difference signal U' and second full depth color difference signal V' are coupled to the format converter 350. Format converter 350 operates in a standard manner to convert the 4:4:4 YUV space video signal represented by the Y, U' and V' components into corresponding RGB space signals S43R, S43G and S43B.

The embodiments of the video compression unit 21 and video decompression unit 43 depicted in FIG. 3 advantageously leverage existing MPEG encoder and decoder technology to provide an electronic cinema quality video information stream comprising a standard resolution video stream S215 and an associated enhancement layer video stream S217. It must be noted that in the absence of the enhancement layer video stream S217, the enhancement layer decoder 320 will produce a null output. Thus, in this case, the output of first adder 330 will comprise only the first standard resolution color difference signal $U_L$, while the output of second adder 340 will comprise only the second standard resolution color difference signal $V_L$.

In one embodiment of the invention, the enhancement layer decoder 320 is responsive to a control signal CONTROL produced by, illustratively, an external control source (i.e., user control) or the decryption unit 42 (i.e., source or access control).

FIG. 4 depicts a high level block diagram of an alternate embodiment of a video compression unit and a video decompression unit according to the invention and suitable for use in the audio-visual information delivery system of FIG. 1. Specifically, the video compression unit 21 depicted in FIG. 4 comprises a format converter 211, a pair of low pass filters (LPFs) 402 and 404, an three MPEG encoders 410-412, an MPEG decoder 420, a pair of subtractors 406 and 408, and a multiplexer 440. Similarly, the video decompression unit 43 depicted in FIG. 4 comprises a demultiplexer 450, second, third and fourth MPEG decoders 421-423, first and second adders 466 and 468, and a format converter 470.

The format converter 211 converts an input RBG video signal S1R, S1B and S1G into a full depth luminance signal Y, a first full depth color difference signal U' and a second full depth color difference signal V'. The first and second full depth color signals, U' and V', are coupled to, respectively, first low pass filter 402 and second low pass filter 404. The first and second full depth color signals, U' and V', are also coupled to a first input of first subtractor 406, and a first input of second subtractor 408.

The first low pass filter 402 and second low pass filter 404 produce, respectively, a first low pass filtered and decimated color difference signal U and a second low pass filtered and decimated color difference signal V. The luminance signal Y, first low pass filtered and decimated color difference signal U and second low pass filtered and decimated color difference signal V are coupled to first MPEG encoder 410. First MPEG encoder 410 operates in the standard manner to produce, illustratively, a 4:2:0 compressed output stream $C_{YUV}$. The MPEG encoded output stream $C_{YUV}$ is coupled to multiplexer 440 and MPEG decoder 420.

MPEG decoder 420 decodes the encoded output stream $C_{YUV}$ produced by MPEG encoder 410 to produce a first decoded color difference signal $U_D$, and a second decoded color difference signal $V_D$. The first decoded color difference signal $U_D$ and the second decoded color difference signal $V_D$ are coupled to, respectively, a second input of first subtractor 406 and a second input of second subtractor 408.

First subtractor 408 subtracts the first decoded color difference signal $U_D$ from the first full depth color difference signal U' to produce a first color sub differencing signal ?U. The second subtractor 408 subtracts the second decoded color difference signal $V_D$ from the second full depth color signal V' to produce a second color sub-difference signal ?V.

The first color sub-difference signal ?U is coupled to a luminance input of second MPEG decoder 411. The second color sub-difference signal ?V is coupled to a luminance input of third MPEG encoded 412. The second MPEG encoder 411 operates in a standard manner to compression code the first color sub-difference signal ?U to produce a first encoded color sub-difference signal $C_{?U}$. The third MPEG encoder 412 operates in a standard manner to compression code the second color sub-difference signal ?V to produce a second coded color difference sub-signal $C_{?V}$. The first and second compression coded color sub-difference signals $C_{?U}$ and $C_{?V}$ are coupled to multiplexer 440.

Multiplexer 440 multiplexes the compression coded output streams from first MPEG encoder 410 ($C_{YUV}$), second MPEG encoder 411 ($C_{?U}$) and third MPEG encoder 412 ($C_{?V}$) to form the compressed bit stream S21.

Referring now to the video decompression unit 43, the demultiplexer 450 receives a compressed bit stream S42 corresponding to the compressed bit stream S21 produced at the output of multiplexer 440. The demultiplexer 450 extracts from the compressed bitstream S42 three compressed video streams corresponding to the outputs of first MPEG encoder 410 ($C_{YUV}$), second MPEG encoder 411 ($C_{?V}$) and third MPEG encoder 412 ($C_{?V}$). Specifically, demultiplexer 450 extracts, and couples to an input of a second MPEG decoder 421, the compressed YUV stream $C_{YUV}$ produced by MPEG encoder 410. Demultiplexer 450 also extracts, and couples to an input of the third MPEG decoder 422, the compressed first color sub-difference stream $C_{?U}$. Demultiplexer 450 also extracts, and couples to an input of the fourth MPEG decoder 423, the compressed second color sub-difference stream $C_{?V}$.

Second MPEG decoder 421 decodes the compressed YUV stream $C_{YUV}$ in a standard manner using, illustratively, 4:2:0 decompression to produce a luminance signal Y, a first low pass filtered and decimated color difference signal U and a second low pass filtered and decimated color difference signal V. Luminance signal Y is coupled directly to format converter 470. First low pass filtered and decimated color difference signal U is coupled to a first input of first adder 466. Second low pass filtered and decimated color difference signal V is coupled to a first input of second adder 468.

Third MPEG decoder 422 operates in a standard manner to decode the first encoded color sub-difference signal $C_{?U}$, to produce at a luminance output a first color sub-difference signal ?U. Fourth MPEG decoder 423 operates in a standard manner to decode second encoded color sub-difference $C_{?V}$ produced at a luminance output a second color sub-difference signal ?V. First and second color sub-difference signal ?U and ?V are coupled to, respectively, a second input of first adder 466, and a second input of second adder 468.

First adder 466 operates in a standard manner to add first low pass filtered and decimated color difference signal U and first color sub-difference signal ?U to produce at an output a first full depth color difference signal U', which is then coupled to format converter 470. Second adder 468 operates in a standard manner to add second low pass filtered and decimated color difference signal V to second color sub-difference signal ?V to produce at an output a second full depth color difference signal V', which is coupled to format converter 470.

Format converter 470 operates in a standard manner to covert full depth luminance signal Y, full depth first color difference signal U' and second full depth color difference signal V' to red R, green G and blue B RGB space output signals.

In the embodiment of FIG. 4, the MPEG encoders 410 through 412, and the MPEG decoders 420 through 423 are standard (i.e., inexpensive) MPEG encoders and decoders that are typically used to operate upon video information signals according to the well known 4:2:0 resolution format. The video compression unit 21 of FIG. 4 operates to produce 3 compressed signals, $C_{YUV}$, $C_{?U}$, and $C_{?V}$. The two compressed color sub-difference signals, $C_{?U}$ and $C_{?V}$, are representative of the difference between the full depth color difference signals U' and V' and the low pass filtered and decimated color difference signals U and V incorporated with the compressed output stream $C_{YUV}$ of the MPEG encoder 410.

MPEG decoder 420 is used to retrieve the actual color difference signals $U_D$ and $V_D$ incorporated within the compressed output stream of output encoder 410. The derived color difference signals are then subtracted from the full depth color difference signals to produce their respective color sub-difference signals. The color sub-difference signals are then encoded by respective MPEG encoders and multiplexed by multiplexer 440.

The video decompression unit operates to decode the $C_{YUV}$, $C_{?U}$, and $C_{?V}$ signals to produce respectively YUV, ?U, and ?V signals. The color sub-difference signal ?U is added back to the decoded color difference signal U to produce the full depth color difference signal U. Similarly, the color sub-difference signal ?V is added back to the color difference signal V to produce a full depth color difference signal V'. In this manner standard MPEG encoders and decoders are used to inexpensively implement a system capable of producing 4:4:4 luma/chroma video information signals.

Figure 5A:
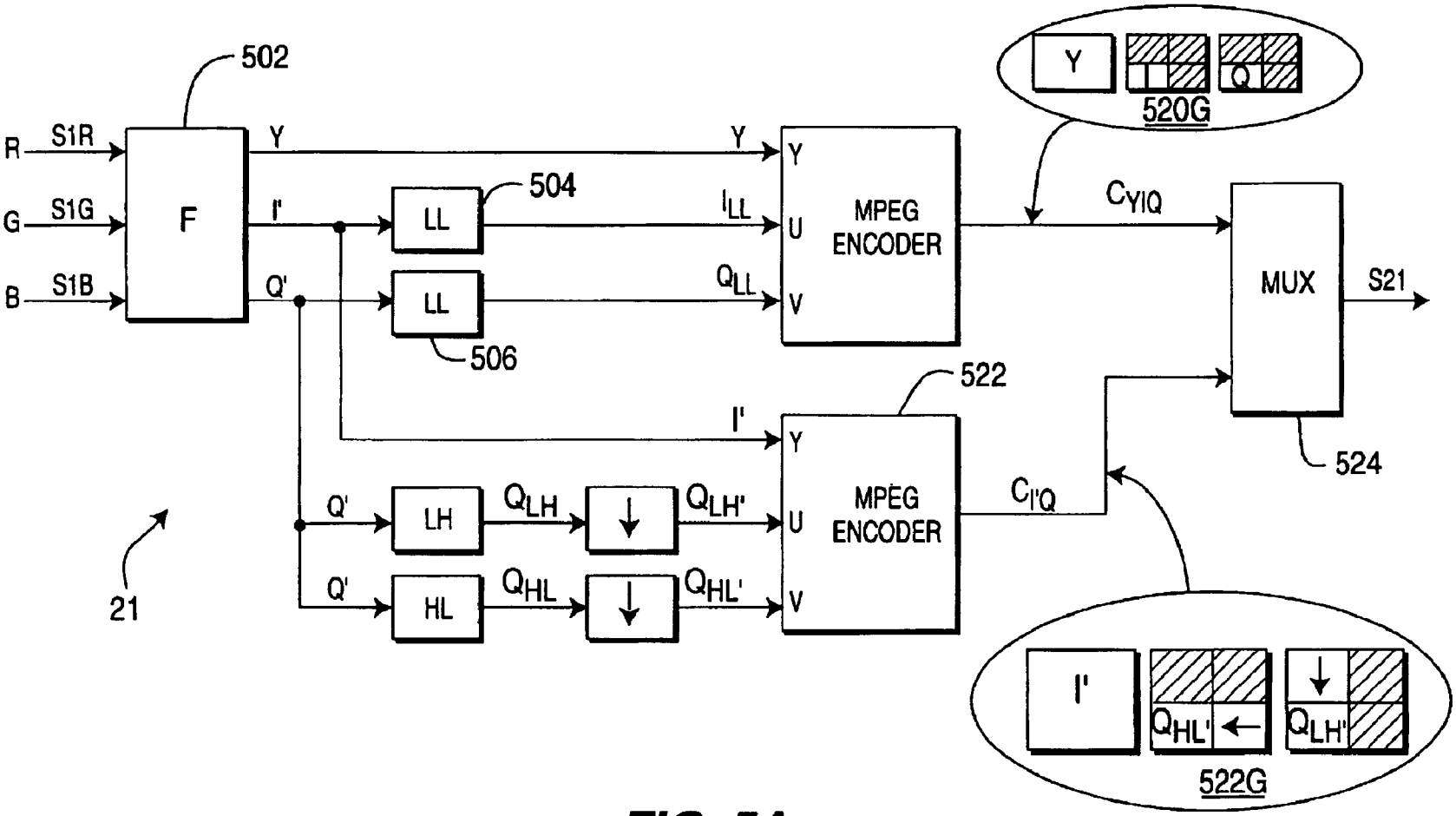
FIG. 5A depicts a high level block diagram of an alternate embodiment of a video compression unit and suitable for use in the audio-visual information delivery system of FIG. 1.
Figure 5B:
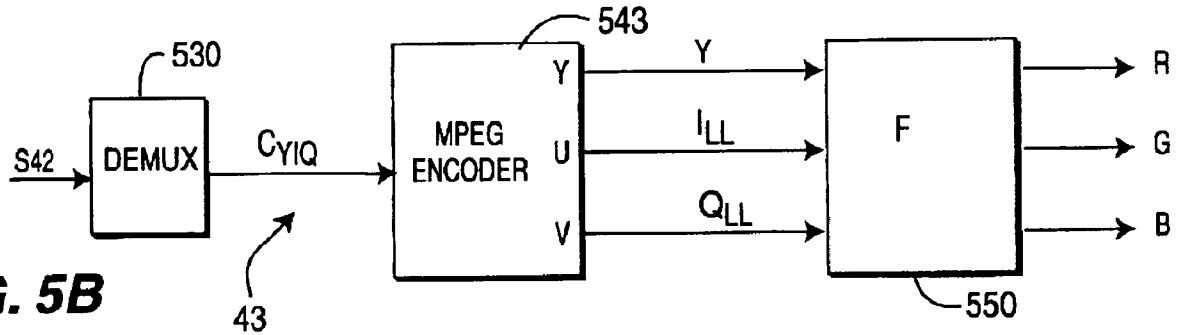
FIGS. 5B and 5C depict a high level block diagram of an alternate embodiment of a video decompression unit and suitable for use in the audio-visual information delivery system of FIG. 1.
Figure 5C:
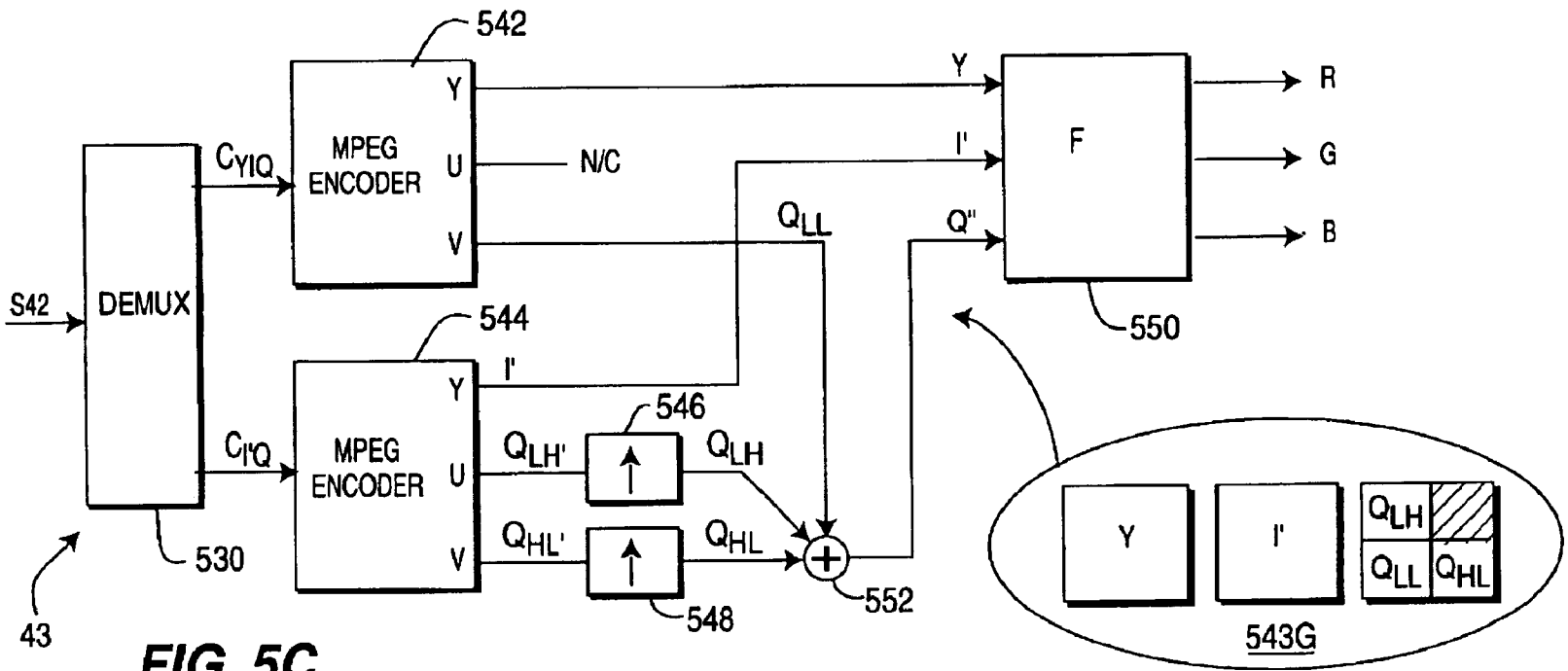

FIG. 5A depicts a high level block diagram of an alternate embodiment of a video compression unit 21 according to the invention and suitable for use in the audio-visual information delivery system of FIG. 1. FIGS. 5B and 5C depict respective high level block diagrams of an alternate embodiment of a video decompression unit 43 according to the invention and suitable for use in an audio-visual information delivery system employing the video compression unit 21 of FIG. 5A.

The video compression unit 21 and video decompression unit 43 depicted in FIGS. 5A-5C are based on the inventor's recognition that YIQ video representations of video require less bandwidth than YUV representations of the same video. Specifically, the color components of a YUV representation (i.e., the U and V color difference signals) require the same amount of bandwidth within standard MPEG systems. Historically, the YUV representations are based on the European PAL analog television scheme. By contrast, the United States NTSC analog television scheme utilizes a YIQ representation of video. The YIQ representation utilizes a lower bandwidth for the Q component than for the I component. This is possible because the Q color vector represents a "purplish" portion of the chrominance spectrum, and a slight degradation in accuracy in this portion of the spectrum is not readily apparent to the human eye. Thus, the total bandwidth requirement of a YIQ representation of a video signal is less than the total bandwidth requirement for a YUV video signal, while providing comparable picture quality.

Referring now to FIG. 5A. The video compression unit 21 depicted in FIG. 5A comprises a format converter 502, a pair of "low horizontal, low vertical" (LL) spatial filters 504 and 506, a "low horizontal, high vertical" (LH) spatial filter 508, a "high horizontal, low vertical" (HL) spatial filter 510, a pair of spatial frequency translators (i.e., downconverters) 509 and 511, a pair of MPEG encoders 520 and 522 and a multiplexer 440.

The format converter 502 converts an input RGB video signal S1R, S1G and S1B into a full depth luminance signal Y, a full depth in-phase chrominance signal I' and a full depth quadrature-phase chrominance signal Q'. The full depth luminance signal Y is coupled to a luminance input Y of first MPEG encoder 520. The full depth in-phase chrominance signal I' and full depth quadrature-phase chrominance signal Q' are coupled to, respectively, first LL spatial filter 504 and second LL spatial filter 506. The full depth quadrature-phase chrominance signal Q' is also coupled to LH spatial filter 508 and HL spatial filter 510. The full depth in-phase chrominance signal I' is also coupled to a luminance input Y of the second MPEG decoder 522.

The LL spatial filter 504 operates in a known manner to horizontally low pass filter and vertically low pass filter the full depth in-phase chrominance signal I' to produce an LL spatial filtered and subsampled in-phase chrominance signal $I_{LL}$, which is then coupled to a first chrominance input of MPEG encoder 520. The LL spatial filter 506 operates in a known manner to horizontally low pass filter and vertically low pass filter the full depth quadrature-phase chrominance signal Q' to produce an LL spatial filtered and subsampled quadrature-phase chrominance signal $Q_{LL}$, which is then coupled to a second chrominance input of MPEG encoder 520.

First MPEG encoder 520 operates in a known manner to produce, illustratively, a 4:2:0 compressed output stream $C_{YIQ}$. The first MPEG encoded output stream $C_{YIQ}$ is coupled to a first input of multiplexer 524.

A graphical depiction illustratives the relative spatial frequency composition of the constituent signals of first MPEG encoded output stream $C_{YIQ}$ 520G is provided to help illustrate the operation of the LL spatial filters 504 and 506.

Graphical depiction 520G shows three boxes of equal size. Each box illustrates the spatial frequency composition of an image component (i.e., Y, I or Q) by depicting the vertical frequencies of the image component as a function of the horizontal frequencies of the image component (i.e., $f_v$ v. $f_h$).

The first box represents the spatial frequency composition of the full depth luminance signal Y, the second box represents the spatial frequency composition of the LL spatial filtered and subsampled in-phase chrominance signal $I_{LL}$ and the third box represents the spatial frequency composition of the LL spatial filtered and subsampled quadrature-phase chrominance signal $Q_{LL}$. A box may be divided into four quadrants, a low horizontal frequency low vertical frequency (LL) quadrant at the lower left, a low horizontal frequency high vertical frequency (LH) quadrant at the upper left, a high horizontal frequency low vertical frequency (HL) quadrant at the lower right and a high horizontal frequency high vertical frequency (HH) quadrant at the upper right. Information within a quadrant may be spectrally shifted to another quadrant in a known manner using frequency converters.

It can be seen by inspection that the full depth luminance signal Y occupies the entire box (i.e., retains full spatial frequency composition). However, both the LL spatial filtered and subsampled in-phase chrominance signal $I_{LL}$ and quadrature-phase chrominance signal $Q_{LL}$ occupy only the lower left quadrant of their respective boxes (i.e., ½ the original spatial frequency composition in each of the vertical and horizontal directions). The shaded portions of the second and third boxes represent those portions of spatial frequency composition that have been removed by the operation of, respectively, the LL spatial filters 504 and 506.

Spatial filters that divide images into the above-described frequency quadrants are well known in the art. For example, quadrature mirror filters (QMF) are suitable for performing this function. Thus, a skilled practitioner may implement LL spatial filters 504 and 506, LH spatial filter 508 and HL spatial filter 510 using QMF techniques.

The LH spatial filter 508 operates in a known manner to horizontally low pass and vertically high pass filter the full depth quadrature-phase chrominance signal Q' to produce an LH spatial filtered and subsampled quadrature-phase chrominance signal $Q_{LH}$, which is then coupled to the first frequency downconverter 509. The first frequency downconverter 509 operates in a known manner to shift the spectral energy of the LH spatial filtered and subsampled quadrature-phase chrominance signal $Q_{LH}$ from the LH quadrant to the LL quadrant. The resulting spectrally shifted quadrature-phase chrominance signal $Q_{LH'}$ is then coupled to a first chrominance input of the second MPEG encoder 522.

The HL spatial filter 510 operates in a known manner to horizontally high pass and vertically low pass filter the full depth quadrature-phase chrominance signal Q' to produce an LH spatial filtered and subsampled quadrature-phase chrominance signal $Q_{HL}$, which is then coupled to the second frequency downconverter 511. The second frequency downconverter 511 operates in a known manner to shift the spectral energy of the HL spatial filtered and subsampled quadrature-phase chrominance signal $Q_{HL}$ from the HL quadrant to the LL quadrant. The resulting spectrally shifted quadrature-phase chrominance signal $Q_{HL'}$ is then coupled to a second chrominance input of the second MPEG encoder 522.

Second MPEG encoder 522 operates in a known manner to produce, illustratively, a 4:2:0 compressed output stream $C_{I'Q}$. The second MPEG encoded output stream $C_{I'Q}$ is coupled to a second input of multiplexer 524.

Multiplexer 524 multiplexes the compression coded output streams from first MPEG encoder 520 ($C_{YIQ}$) and second MPEG encoder 522 ($C_{I'Q'}$) to form the compressed bit stream S21.

A graphical depiction illustrative the relative spatial frequency composition of the constituent signals of second MPEG encoded output stream $C_{I'Q}$ 522G is provided to help illustrate the operation of the LH spatial filter 508, HL spatial filter 510 and frequency downconverters 509 and 511.

Graphical depiction 522G shows three boxes of equal size. The first box represents the spatial frequency composition of the full depth in-phase chrominance signal I', the second box represents the spatial frequency composition of the HL spatial filtered and subsampled, frequency downconverted, quadrature-phase chrominance signal $Q_{HL'}$, and the third box represents the spatial frequency composition of the LH spatial filtered and subsampled, frequency downconverted, quadrature-phase chrominance signal $Q_{LH'}$.

It can be seen by inspection that the full depth in-phase chrominance signal I' occupies the entire box (i.e., retains full spatial frequency composition). However, both the LH spatial filtered and subsampled, frequency downconverted, quadrature-phase chrominance signal $Q_{LH'}$ and the HL spatial filtered and subsampled, frequency downconverted, quadrature-phase chrominance signal $Q_{HL'}$ OCCUPY only the lower left quadrant of their respective boxes (i.e., ½ the original spatial frequency composition in each of the vertical and horizontal directions). The shaded portions of the second and third boxes (along with the lower left quadrants) represent those portions of spatial frequency composition that have been removed by the operation of, respectively, the HL spatial filter 510 and the LH spatial filter 508. The $Q_{LH'}$ and $Q_{HL'}$ were spectrally shifted by, respectively, frequency downconverters 509 and 511 to the LL quadrant from the quadrants indicated by the arrows.

The multiplexed output stream S21 comprises a full depth luminance signal Y, a full depth in-phase chrominance signal I' and a partial resolution quadrature-phase chrominance signal ($Q+Q_{LH'}+Q_{HL'}$). In effect, the multiplexed output stream S21 comprises a 4:4:3 coded YIQ representation of video information. However, it is known in the television arts to reconstruct an RGB (or YUV) format television signal using the YIQ format television signal comprising a full bandwidth luminance signal, full bandwidth in-phase chrominance signal and partial bandwidth quadrature-phase chrominance signal. Thus, as previously described, the video compression unit 21 embodiment of FIG. 5A advantageously exploits the non-symmetrical bandwidth of chrominance components within a YIQ formatted television signal to achieve a further reduction in circuit complexity.

FIGS. 5B and 5C depict respective high level block diagrams of an alternate embodiment of a video decompression unit according to the invention and suitable for use in an audio-visual information delivery system employing the video compression unit 21 of FIG. 5A.

FIG. 5B depicts a video decompression unit 43 comprising a demultiplexer 530, an MPEG decoder 543 and a format converter 550. The demultiplexer 530 receives a compressed bit stream S42 corresponding to the compressed bit stream S21 produced at the output of multiplexer 524. The demultiplexer 530 extracts, and couples to the MPEG decoder 543, the compressed video stream corresponding to the output of the first MPEG encoder 520 of FIG. 5A ($C_{YIQ}$).

The MPEG decoder 543 decodes the compressed stream $C_{YIQ}$ in a standard manner using, illustratively, 4:2:0 decompression to retrieve the full depth luminance signal Y, LL spatial filtered and subsampled in-phase chrominance signal $I_{LL}$ and LL spatial filtered and subsampled quadrature-phase chrominance signal $Q_{LL}$, each of which is coupled to the format converter 550.

Format converter 550 operates in a standard manner to convert the YIQ space video signal comprising full depth luminance signal Y, LL spatial filtered and subsampled in-phase chrominance signal $I_{LL}$ and LL spatial filtered and subsampled quadrature-phase chrominance signal $Q_{LL}$ to red R, green G and blue B RGB space output signals.

FIG. 5C depicts a video decompression unit 43 comprising a demultiplexer 530, first and second MPEG decoders 542 and 544, a pair of frequency upconverters 546 and 548, an adder 552 and a format converter 550. The demultiplexer 530 receives a compressed bit stream S42 corresponding to the compressed bit stream S21 produced at the output of multiplexer 524. The demultiplexer 530 extracts, and couples to the first MPEG decoder 542, the compressed video stream corresponding to the output of the first MPEG encoder 520 of FIG. 5A ($C_{YIQ}$). The demultiplexer 530 extracts, and couples to the second MPEG decoder 544, the compressed video stream corresponding to the output of the second MPEG encoder 522 of FIG. 5A ($C_{I'Q}$).

The first MPEG decoder 542 decodes the compressed YIQ stream $C_{YIQ}$ in a standard manner using, illustratively, 4:2:0 decompression to retrieve the full depth luminance signal Y and the LL spatial filtered and subsampled quadrature-phase chrominance signal $Q_{LL}$. It should be noted that while a standard MPEG decoder will also retrieve the LL spatial filtered and subsampled in-phase chrominance signal $I_{LL}$, this signal is not used in the video decompression unit 43 of FIG. 5C. The full depth luminance signal Y is coupled to a luminance input of the format converter 550. The LL spatial filtered and subsampled quadrature-phase chrominance signal $Q_{LL}$ is coupled to a first input of the adder 552.

The second MPEG decoder 544 decodes the compressed stream $C_{I'Q}$ in a standard manner using, illustratively, 4:2:0 decompression to retrieve the full depth in-phase chrominance signal I', the LH spatial filtered and subsampled, frequency downconverted, quadrature-phase chrominance signal $Q_{LH'}$, and the HL spatial filtered and subsampled, frequency downconverted, quadrature-phase chrominance signal $Q_{HL'}$. The full depth in-phase chrominance signal I' is coupled to a first chrominance input of format converter 550. The LH spatial filtered and subsampled, frequency downconverted, quadrature-phase chrominance signal $Q_{LH'}$ is coupled to the first frequency upconverter 546. The HL spatial filtered and subsampled, frequency downconverted, quadrature-phase chrominance signal $Q_{HL'}$ is coupled to the second frequency upconverter 548.

The frequency upconverter 546 operates in a known manner to upconvert the LH spatial filtered and subsampled, frequency downconverted, quadrature-phase chrominance signal $Q_{LH'}$ to produce LH spatial filtered and subsampled quadrature-phase chrominance signal $Q_{LH'}$ That is, the frequency upconverter 546 shifts the spectral energy of the LH spatial filtered and subsampled, frequency downconverted, quadrature-phase chrominance signal $Q_{LH'}$ from the LL quadrant to the LH quadrant. The resulting upconverted signal $Q_{LH}$ is coupled to a second input of adder 552.

The frequency upconverter 548 operates in a known manner to upconvert the HL spatial filtered and subsampled, frequency downconverted, quadrature-phase chrominance signal $Q_{HL'}$ to produce HL spatial filtered and subsampled quadrature-phase chrominance signal $Q_{HL}$. That is, the frequency upconverter 546 shifts the spectral energy of the HL spatial filtered and subsampled, frequency downconverted, quadrature-phase chrominance signal $Q_{HL'}$ from the LL quadrant to the HL quadrant. The resulting upconverted signal $Q_{HL}$ is coupled to a third input of adder 552.

Adder 552 adds the LL spatial filtered and subsampled quadrature-phase chrominance signal $Q_{LL}$ , the LH spatial filtered and subsampled quadrature-phase chrominance signal $Q_{LH}$ and the HL spatial filtered and subsampled quadrature-phase chrominance signal $Q_{HL}$ to produce a near full-resolution quadrature-phase chrominance signal Q". The near full-resolution quadrature-phase chrominance signal Q" has a resolution of approximately three fourths the resolution of the full depth quadrature-phase chrominance signal Q'. The near full-resolution quadrature-phase chrominance signal Q" is coupled to a second chrominance input of format converter 550.

Format converter 550 operates in a standard manner to convert the YIQ space video signal comprising full depth luminance signal Y, the full depth in-phase chrominance signal I' and the near full-resolution quadrature-phase chrominance signal Q" to red R, green G and blue B RGB space output signals.

A graphical depiction 543G illustrative the relative spatial frequency composition of the constituent signals provided to the format converter 550 is provided to help illustrate the invention.

Graphical depiction 543G shows three boxes of equal size. The first box represents the spatial frequency composition of the full depth luminance signal Y, the second box the spatial frequency composition of the full depth in-phase chrominance signal I' and the third box represents the spatial frequency composition of the near full-resolution quadrature-phase chrominance signal Q".

It can be seen by inspection that the full depth luminance signal Y and the in-phase chrominance signal I' occupy the entirety of their respective boxes. By contrast, the near full-resolution quadrature-phase chrominance signal Q" occupies three fourths of its box. The shaded portion of the third box represent the portion of the full depth quadrature-phase chrominance signal Q' removed by the operation of the video compression unit 21 of FIG. 5A.

It must be noted that the near full-resolution quadrature-phase chrominance signal Q" only lacks information from HH quadrant (i.e., the high frequency horizontal and high frequency vertical quadrant). However, a loss of information from the HH quadrant is less discernible to the human eye than a loss of information from one of the other quadrants. Moreover, the full depth in-phase chrominance signal I' may be used in a standard manner to provide some of this information. Thus, to the extent that the quadrature-phase chrominance signal Q" is compromised, the impact of that compromise is relatively low, and the compromise may be ameliorated somewhat using standard YIQ processing techniques.

The invention has been described thus far as operating on, e.g., 4:4:4 resolution MPEG video signals having a standard 8-bit dynamic range. The 8-bit dynamic range is used because standard (i.e., "off the shelf") components such as the MPEG encoders, decoders, multiplexers and other components described above in the various figures tend to be adapted or mass produced in response to the need of the 8-bit television and video community.

While an 8-bit dynamic range at 4:4:4 coding provides impressive picture quality, it may not be sufficient for the electronic cinema quality applications. Thus, the following portion of the disclosure will address modifications to the above figures suitable for implementing a high dynamic range system, illustratively a 10-bit dynamic range system. Specifically, an enhanced MPEG encoder and associated enhanced MPEG decoder will now be described. The enhanced encoder and decoder are based on the regional pixel depth compaction method and apparatus described in detail in co-pending U.S. patent application Ser. No. 09/050,304, filed on Mar. 30, 1998, and Provisional U.S. Patent Application No. 60/071,294, filed on Jan. 16, 1998, both of which are incorporated herein by reference in their entireties.

Briefly, the described method and apparatus segments a relatively high dynamic range signal into a plurality of segments (e.g., macroblocks within a video signal); determines the maximum and minimum values of a parameter of interest (e.g., a luminance, chrominance or motion vector parameter) within each segment, remaps each value of a parameter of interest to, e.g., a lower dynamic range defined by the maximum and minimum values of the parameter of interest; encodes the remapped segments in a standard (e.g., lower dynamic range) manner; multiplexes the encoded remapped information segments and associated maximum and minimum parameter values to form a transport stream for subsequent transport to a receiving unit, where the process is reversed to retrieve the original, relatively high dynamic range signal. A technique for enhancing color depth on a regional basis can be used as part of the digitizing step to produce better picture quality in the images and is disclosed in the above-referenced Provisional U.S. patent application.

Figure 6A:
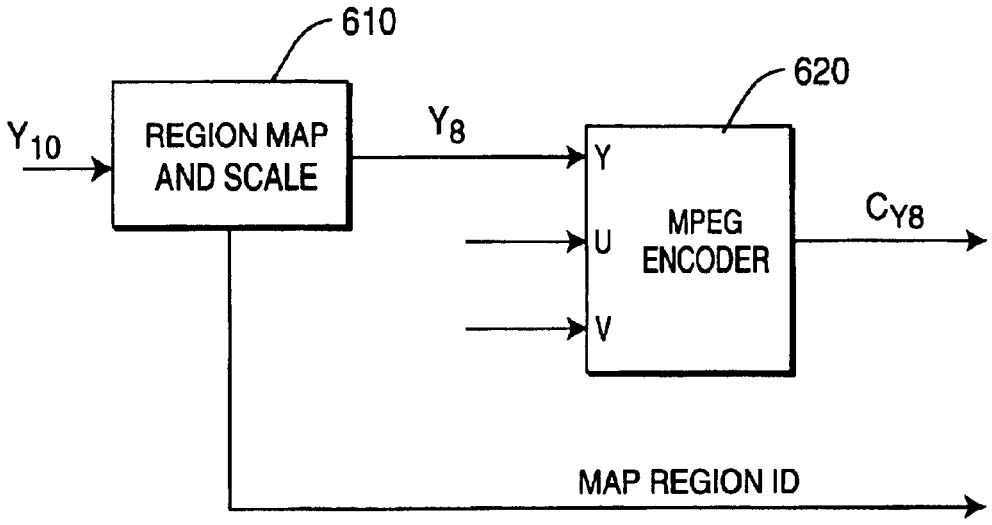
FIG. 6A depicts an enhanced bandwidth MPEG encoder.

FIG. 6A depicts an enhanced bandwidth MPEG encoder. Specifically, FIG. 6A depicts a standard MPEG encoder 620 and an associated regional map and scale unit 610 that together form an enhanced bandwidth MPEG encoder.

The region map and scale unit 610 receives a relatively high dynamic range information signal $Y_{10}$, illustratively a 10-bit dynamic range luminance signal, from an information source such as a video source (not shown). The region map and scale unit 610 divides each picture-representative, frame-representative or field-representative portion of the relatively high dynamic range information signal $Y_{10}$ into a plurality of, respectively, sub-picture regions, sub-frame regions or sub-field regions. These sub-regions comprise, illustratively, fixed or variable coordinate regions based on picture, frame, field, slice macroblock, block and pixel location, related motion vector information and the like. In the case of a video information stream, an exemplary region comprises a macroblock region size.

Each of the plurality of sub-regions are processed to identify, illustratively, a maximum luminance level ($Y_{MAX}$) and a minimum luminance level ($Y_{MIN}$) utilized by pixels within the processed region. The luminance information within each region is then scaled (i.e., remapped) from, illustratively, the original 10-bit dynamic range (i.e., 0 to 1023) to an 8-bit dynamic range (i.e., 0-255) having upper and lower limits corresponding to the identified minimum luminance level ($Y_{MIN}$) and maximum luminance level ($Y_{MAX}$) of the respective region to produce, at an output, an relatively low dynamic range, illustratively 8-bit, information signal $Y_8$. The maximum and minimum values associated with each region, and information identifying the region, are coupled to an output as a map region ID signal.

An encoder 610, illustratively an MPEG-like video encoder, receives the remapped, relatively low dynamic range information signal $Y_8$ from the region map and scale unit 610. The video encoder 15 encodes the relatively low dynamic range information signal $Y_8$ to produce a compressed video signal $C_{Y8}$, illustratively an MPEG-like video elementary stream.

The above described enhanced MPEG encoder may be used to replace any of the standard MPEG encoders depicted in any of the previous figures. It should be noted that the exemplary enhanced MPEG encoder is shown as compressing a 10-bit luminance signal Y10 into an 8-bit luminance signal Y8 that is coupled to a luminance input of a standard MPEG encoder. As previously discussed, the signal applied to the luminance input (Y) of an MPEG encoder is typically encoded at a full depth of 8-bits, while signals applied to the chrominance inputs (U, V) of the MPEG encoder are typically encoded at less than full depth, such that the encoder nominally produces a 4:2:0 compressed signal. It must be noted that the region map and scale unit (or an additional unit) may be used to adapt a relatively high dynamic range signal (e.g., 10-bit) to the less than full depth range required for the MPEG encoder chrominance input. Such an adaptation is contemplated by the inventor to be within the scope of his invention.

Figure 6B:
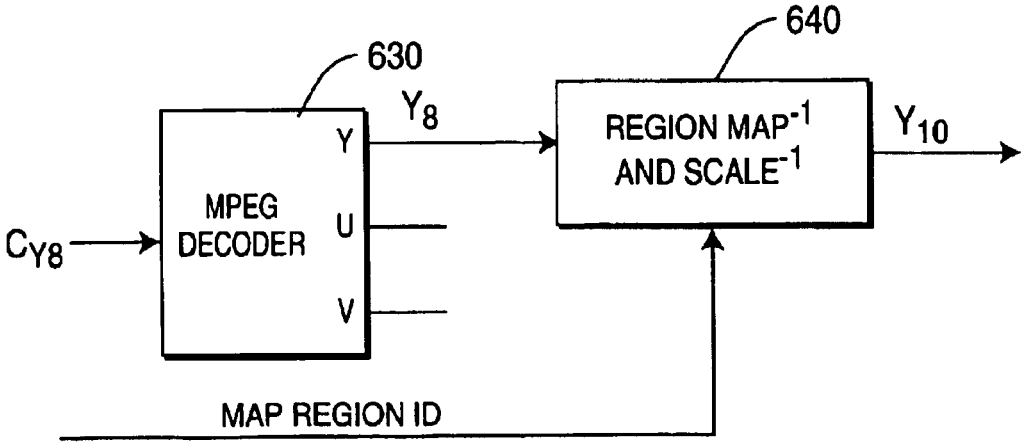
FIG. 6B depicts an enhanced bandwidth MPEG decoder suitable for use in a system employing the enhanced bandwidth MPEG encoder of FIG. 6A.

FIG. 6B depicts an enhanced bandwidth MPEG decoder that is suitable for use in a system employing the enhanced bandwidth MPEG encoder of FIG. 6A. Specifically, FIG. 6B depicts a standard MPEG decoder 630 and an associated inverse regional map and scale unit 630 that together form an enhanced bandwidth MPEG decoder.

The decoder 630, illustratively an MPEG-like video decoder, receives and decodes, in a known manner, the compressed video signal $C_{Y8}$ to retrieve the relatively low dynamic range information signal $Y_8$, which is then coupled to the inverse region map and scale unit 630.

The inverse region map and scale unit 630 receives the relatively low dynamic range information signal $Y_8$, illustratively an 8-bit luminance signal, and the associated map region ID signal. The inverse region map and scale unit 630 remaps the 8-bit baseband video signal S13, on a region by region basis, to produce a 10-bit video signal S15 corresponding to the original 10-bit dynamic range video signal S1. The produced 10-bit video signal is coupled to a video processor (not shown) for further processing. The inverse region map and scale unit 60 retrieves, from the map region ID signal S14, the previously identified maximum luminance level ($Y_{MAX}$) and minimum luminance level ($Y_{MIN}$) associated with each picture, frame or field sub-region, and any identifying information necessary to associate the retrieved maximum and minimum values with a particular sub-region within relatively low dynamic range information signal $Y_8$. The luminance information associated with each region is then scaled (i.e., remapped) from the 8-bit dynamic range bounded by the identified minimum luminance level ($Y_{MIN}$) and maximum luminance level ($Y_{MAX}$) associated with the region to the original 10-bit (i.e., 0-1023) dynamic range to substantially reproduce the original 10-bit luminance signal $Y_{10}$.

Since the map region ID signal is necessary to restore the original dynamic range of the compressed video signal $C_{Y8}$, both of the signals are coupled to a decoder, such as the enhanced MPEG decoder of FIG. 6B. These signals may be coupled to the enhanced decoder directly or via a transport mechanism. For example, in the case of an enhanced encoder providing an encoded bitstream to a multiplexer (e.g., MPEG encoder 218R and multiplexer 219 of FIG. 2), the associated map region ID may be included as a distinct multiplexed stream or as part of a user stream. An enhanced decoder will retrieve both stream in a standard manner from a demultiplexer (e.g., MPEG decoder 432R and demultiplexer 431 of FIG. 2).

It is crucial to note that any MPEG encoder depicted in any of the preceding figures may be replaced with the enhanced MPEG encoder depicted in FIG. 6A. Similarly, any MPEG decoder depicted in any of the preceding figures may be replaced with the enhanced MPEG decoder depicted in FIG. 6B. In the event that an enhanced decoder is used without a corresponding enhanced encoder, the inverse region map and scale unit 630 will not provide an enhancement function. However, the relatively low dynamic range signal applied to the inverse region map and scale unit 630 will not be further degraded.

Thus, by judicious application of the enhanced MPEG encoder and enhanced MPEG decoder of, respectively, FIGS. 6A and 6B in the above embodiments of the invention, enhanced dynamic range for both luminance and chrominance components in an electronic cinema quality system may be realized. Moreover, the embodiments described may be implemented in an economical manner using primarily off-the-shelf components.

Although various embodiments which incorporate the teachings of the present invention have been shown and described in detail herein, those skilled in the art can readily devise many other varied embodiments that still incorporate these teachings.

What is claimed is:

1. An apparatus [for] *configured to* [processing] *process* a video information signal comprising a plurality of full dynamic range components, said apparatus comprising:

a compression encoder providing at least inter-frame coding, [for] *configured to* compression [encoding] *encode* said video information signal in a manner substantially retaining said full dynamic range of said full dynamic range components, said compression encoder comprising at least two standard encoders, each of said standard encoders being responsive to up to three component video signals, each of said standard compression encoders tending to substantially preserve a dynamic range and spatial resolution of one component of said video signal, each of said standard compression encoders providing a compressed output video signal; and a multiplexer, [for multiplexing] *configured to multiplex* said compressed output video signals of said two or more standard compression encoders to produce a multiplexed information stream.

2. The apparatus of claim 1, further comprising:

an encryption encoder, [for] *configured to* [encrypting] *encrypt* at least one of said compressed output video signals of said two or more standard compression encoders according to one of a watermarking process and an encryption process.

3. The apparatus of claim 1, further comprising:

a demultiplexer, [for demultiplexing] *configured to demultiplex* said multiplexed information stream to retrieve said compressed output video signals [of] *produced by* said two or more standard compression encoders; and a compression decoder, [for] *configured to* compression [decoding said] *decode the* retrieved compressed output video signals [of] *produced by* said two or more standard compression encoders to produce a retrieved video information signal, said compression decoder comprising at least two standard decoders, each of said standard decoders receiving a respective one of [said] *the* retrieved compressed output video signals, each of said standard compression decoders being responsive to up to three component video signals within said respective one *of the retrieved* compressed *output* video [signal] *signals*, each of said standard compression decoders tending to substantially preserve a dynamic range and spatial resolution of one component within said respective one *of the retrieved* compressed *output* video [signal] *signals*.

4. The apparatus of claim 3, further comprising:

an encryption decoder, [for encrypting] *configured to decrypt* at least one of said compressed output video signals of said two or more standard compression encoders according to one of a watermarking process and [an encryption] *a decryption* process.

5. The apparatus of claim [4] *2*, further comprising:

a transport encoder, [for] *configured to* transport [encoding] *encode* said multiplexed information stream to produce a transport encoded information stream;

means for transporting said transport encoded information stream; and a transport decoder, [for retrieving] *configured to retrieve* said multiplexed information stream from said transport encoded information stream.

6. The apparatus of claim 4, further comprising:

a store for distribution unit, [for storing] *configured to store* one or more multiplexed information streams;

a transport encoder, [for] *configured to* transport [encoding] *encode* said one or more multiplexed information streams to produce a transport encoded information stream;

means for transporting said transport encoded information stream;

a transport decoder, [for retrieving] *configured to retrieve* said one or more multiplexed information streams from said transport encoded information stream; and a store for display unit, [for storing] *configured to store* said retrieved one or more multiplexed information streams.

7. The apparatus of claim 5, further comprising:

a demultiplexer, [for demultiplexing] *configured to demultiplex* said multiplexed information stream to retrieve said compressed output video signals of said two or more standard compression encoders; and a compression decoder, [for] *configured to* compression [decoding] *decode* said retrieved compressed output video signals of said two or more standard compression encoders to produce a retrieved video information signal, said compression decoder comprising at least two standard decoders, each of said standard decoders receiving a respective one of said retrieved compressed output video signals, each of said standard compression decoders being responsive to up to three component video signals within said respective one compressed video signal, each of said standard compression decoders tending to substantially preserve a dynamic range and spatial resolution of one component within said respective one compressed video signal.

8. The apparatus of claim 6, further comprising:

a demultiplexer, [for demultiplexing] *configured to demultiplex* said multiplexed information stream to retrieve said compressed output video signals of said two or more standard compression encoders; and a compression decoder, [for] *configured to* compression [decoding] *decode* said retrieved compressed output video signals of said two or more standard compression encoders to produce a retrieved video information signal, said compression decoder comprising at least two standard decoders, each of said standard decoders receiving a respective one of said retrieved compressed output video signals, each of said standard compression decoders being responsive to up to three component video signals within said respective one compressed video signal, each of said standard compression decoders tending to substantially preserve a dynamic range and spatial resolution of one component within said respective one compressed video signal.

9. The apparatus of claim 7, further comprising a display device, [for displaying] *configured to display* said retrieved video information signal.

10. The apparatus of claim 1, further comprising:

a demultiplexer, [for demultiplexing] *configured to demultiplex* said multiplexed information stream to retrieve said compressed output video signals of said two or more standard compression encoders; and one or more compression decoders, [for] *configured to* compression [decoding] *decode* respective retrieved compressed output video signals of said two or more standard compression encoders to produce respective retrieved video information signals, said one or more compression decoders each comprising at least two standard decoders, each of said standard decoders receiving a respective one of said retrieved compressed output video signals, each of said standard compression decoders being responsive to up to three component video signals within said respective one compressed video signal, each of said standard compression decoders tending to substantially preserve a dynamic range and spatial resolution of one component within said respective one compressed video signal.

11. The apparatus of claim 10, wherein:

each of said one or more compression decoders is associated with a display device, said display device [for displaying] *configured to display* said retrieved video information signal.

12. The apparatus of claim 1, wherein said compression encoder further comprises:

at least one regional map and scale unit associated with each of said at least two standard encoders, [for segmenting] *configured to segment* a component video signal into one or more information regions, and for remapping one or more relatively high dynamic range information parameters associated with each information region according to respective intra-region information parameter maxima and minima to produce a remapped component video signal and an associated map region identification stream, said one or more remapped information parameters having a relatively low dynamic range; and an compression encoder, coupled to said regional map and scale unit, [for] *configured to* compression [encoding] *encode* said remapped information stream to produce a compression encoded information stream.

13. The apparatus of claim 12, further comprising:

a transport encoder, coupled to said regional map and scale unit and said compression encoder, [for] *configured to* transport [encoding] *encode* said compression encoded information stream and said map region identification stream to produce a transport stream.

14. The apparatus of claim 13, further comprising:

a transport decoder, coupled to receive said transport stream, [for] *configured to* transport [decoding] *decode* said transport stream to recover said compression encoded information stream and said associated map region identification stream;

a compression decoder, coupled to said transport decoder, [for] *configured to* compression [decoding] *decode* said recovered compression encoded information stream to recover said remapped information stream; and an inverse regional map and scale unit, coupled to said compression decoder and said transport decoder, [for] *configured to* inverse [remapping] *remap* said recovered remapped information stream according to said associated map region identification stream to substantially recover said information stream.

15. The apparatus of claim 13, wherein:

said information stream comprises at least a video information stream;

said compression encoder comprises an MPEG-like compression encoder; and said transport encoder comprises an MPEG-like transport encoder.

16. The apparatus of claim 12, wherein:

said regional map and scale unit imparts a transfer characteristic to said remapped information stream comprising at least one of a gamma correction characteristic, a companding characteristic, a statistical redistribution characteristic, a simple linear characteristic, an arbitrary polynomial characteristic and a pre-determined function characteristic.

17. The apparatus of claim 12, wherein each information region is defined with respect to one of a picture, frame, field, slice, macroblock, block, pixel location, and motion vector.

18. The apparatus of claim 1, wherein said compression encoder comprises:

a first standard encoder, [for encoding] *configured to encode* a luminance component of said video signal in a manner substantially preserving a dynamic range and spatial resolution of said luminance component;

a second standard encoder, [for encoding] *configured to encode* a first chrominance component of said video signal in a manner substantially preserving a dynamic range and spatial resolution of said first chrominance component; and a third standard encoder, [for encoding] *configured to encode* a second chrominance component of said video signal in a manner substantially preserving a dynamic range and spatial resolution of said second chrominance component.

19. The apparatus of claim 3, wherein said compression decoder comprises:

a first standard decoder, [for decoding] *configured to decode* said luminance component of said video signal in a manner substantially preserving said dynamic range and spatial resolution of said luminance component;

a second standard decoder, [for decoding] *configured to decode* said first chrominance component of said video signal in a manner substantially preserving said dynamic range and spatial resolution of said first chrominance component; and a third standard decoder, [for decoding] *configured to decode* said second chrominance component of said video signal in a manner substantially preserving said dynamic range and spatial resolution of said second chrominance component.

20. [Apparatus for processing] *An apparatus configured to process* a video signal, said video signal comprising a luminance component, a first color component and a second color component, said video signal components having respective full dynamic ranges, said apparatus comprising:

a first compression encoder, providing at least inter-frame coding, [for encoding] *configured to encode* said video signal to produce a first encoded video signal, said first compression encoder encoding substantially the entire dynamic range of said luminance component of said video signal, a first portion of said dynamic range of said first color component of said video signal, and a first portion of said dynamic range of said second color component of said video signal; and a second compression encoder, [for encoding] *configured to encode* a second portion of said dynamic range of said first color component of said video signal and a second portion of said dynamic range of said second color component of said video signal.

21. The apparatus of claim 20, further comprising:

a first filter complement, [for filtering] *configured to filter* said first color component of said video signal to produce a low pass filtered first color component signal and a high pass filtered first color component signal; and a second filter complement, [for filtering] *configured to filter* said second color component of said video signal to produce a low pass filtered second color component signal and a high pass filtered second color component signal;

said low pass filtered first color component signal and said low pass filtered second color component signal being coupled to said first compression encoder as first dynamic range portions of, respectively, said first and second color components of said video signal; and said high pass filtered first color component signal and said high pass filtered second color component signal being coupled to said second compression encoder as second dynamic range portions of, respectively, said first and second color components of said video signal.

22. The apparatus of claim 20, further comprising:

a first low pass filter, [for filtering] *configured to filter* said first color component of said video signal to produce a low pass filtered first color component signal, said low pass filtered first color component signal being coupled to said first compression encoder as a first dynamic range portion of said first color component of said video signal; and a second low pass filter, [for filtering] *configured to filter* said second color component of said video signal to produce a low pass filtered second color component signal, said low pass filtered second color component signal being coupled to said first compression encoder as a first dynamic range portion of said second color component of said video signal.

23. The apparatus of claim 20, wherein said second compression encoder comprises:

a decoder, [for decoding] *configured to decode* said first and second color components of said first encoded video signal to produce, respectively, a first decoded color component signal and a second decoded color component signal;

a first subtractor, [for substracting] *configured to subtract* said first decoded color component signal from said first color component of said video signal to produce a first color difference signal;

a second subtractor, [for substracting] *configured to subtract* said second decoded color component signal from said second color component of said video signal to produce a second color difference signal;

a first standard compression encoder, receiving said first color difference signal at a nominally luminance input, [for encoding] *configured to encode* said first color difference signal to produce an encoded first color difference signal; *and* a second standard compression encoder, receiving said second color difference signal at a nominally luminance input, [for encoding] *configured to encode* said second color difference signal to produce an encoded second color difference signal.

24. The apparatus of claim 20, wherein said first color component comprises an in-phase chrominance component, said second color component comprises a quadrature-phase chrominance component, and said first compression encoder further comprises:

a first horizontal low pass/vertical low pass (LL) filter, [for filtering] *configured to filter* said first color component of said video signal to produce an LL filtered first color component signal, said LL filtered first color component signal being coupled to said first compression encoder as a first dynamic range portion of said first color component of said video signal; and a second horizontal low pass/vertical low pass (LL) filter, [for filtering] *configured to filter* said second color component of said video signal to produce an LL filtered second color component signal, said LL filtered second color component signal being coupled to said first compression encoder as a first dynamic range portion of said second color component of said video signal.

25. [Apparatus, for encoding] *An apparatus configured to encode* a video signal to produce an encoded video information stream, said video signal comprising a plurality of full dynamic range components, said apparatus comprising:

a plurality of standard compression encoders providing at least inter-frame coding, each standard compression encoder comprising a substantially full dynamic range encoding channel and a plurality of partial dynamic range encoding channels, each standard compression encoder being associated with a respective full dynamic range component of said video signal, each standard compression encoder encoding, using said respective substantially full dynamic range encoding channel, said respective full dynamic range component of said video signal to produce a respective full dynamic range encoded video signal component;

a multiplexer, [for multiplexing] *configured to multiplex* said full dynamic range encoded video signal components produced by said standard compression encoders to produce said encoded video information stream.

26. The apparatus of claim 25, further comprising:

an encryption encoder, [for encrypting] *configured to encrypt* at least one of said compressed output video component signals according to one of a watermarking process and an encryption process.

27. The apparatus of claim 25, wherein said dynamic range of at least one of said full dynamic range components exceeds a dynamic range of said plurality of standard compression encoders, said apparatus further comprising:

a respective regional map and scale unit associated with each of said exceeding full dynamic range components, [for segmenting] *configured to segment* said respective exceeding full dynamic range component into one or more information regions, and [for remapping] *configured to remap* one or more relatively high dynamic range information parameters associated with each information region according to respective intra-region information parameter maxima and minima to produce a remapped component video signal and an associated map region identification stream, said one or more remapped information parameters having a relatively low dynamic range; and a compression encoder, coupled to each respective regional map and scale unit, [for] *configured to* compression [encoding] *encode* said respective remapped information stream to produce a respective compression encoded map information stream.

28. [Apparatus, for encoding] *An apparatus configured to encode* a video signal to produce an encoded video information stream, said video signal comprising a full dynamic range luminance component, a full dynamic range first chrominance component and a full dynamic range second chrominance component, said apparatus comprising;

a first filter, responsive to said full dynamic range first chrominance component to produce a low pass filtered first chrominance component;

a second filter, responsive to said full dynamic range second chrominance component to produce a low pass filtered second chrominance component;

a first compression encoder providing at least inter-frame coding, comprising a relatively high dynamic range encoding channel, [for encoding] *configured to encode* said full dynamic range luminance component, and a pair of relatively low dynamic range encoding channels [for encoding] *configured to encode* said low pass filtered first and second chrominance components;

a second compression encoder, [for encoding] *configured to encode* at least those portions of said full dynamic range first and second chrominance components not provided to said first compression encoder;

a multiplexer, [for multiplexing] *configured to multiplex* said encoded video components to produce said encoded video information stream.

29. The apparatus of claim 28, further comprising:

an encryption encoder, [for encrypting] *configured to encrypt* at least one of said compressed output video component signals according to one of a watermarking process and an encryption process.

30. The apparatus of claim 28, wherein said dynamic range of at least one of said full dynamic range components exceeds a dynamic range of said plurality of standard compression encoders, said apparatus further comprising:

a respective regional map and scale unit associated with each of said exceeding full dynamic range components, [for segmenting] *configured to segment* said respective exceeding full dynamic range component into one or more information regions, and [for remapping] *configured to remap* one or more relatively high dynamic range information parameters associated with each information region according to respective intra-region information parameter maxima and minima to produce a remapped component video signal and an associated map region identification stream, said one or more remapped information parameters having a relatively low dynamic range; and a compression encoder, coupled to each respective regional map and scale unit, [for] *configured to* compression [encoding] *encode* said respective remapped information stream to produce a respective compression encoded map information stream.

31. The apparatus of claim 28, wherein:

said first filter produces a high pass filtered first chrominance component;

said second filter produces a high pass filtered second chrominance component; and said high pass filtered first chrominance component and said high pass filtered second chrominance component comprising said portions of said full dynamic range first and second chrominance components not provided to said first compression encoder.

32. The apparatus of claim 28, wherein said first and second filters comprise filter complements.

33. The apparatus of claim 28, wherein said second encoder comprises:

a first standard encoder including a relatively high dynamic range encoding channel [for encoding] *configured to encode* said portions of said full dynamic range first chrominance component not provided to said first encoder; and a second standard encoder including a relatively high dynamic range encoding channel [for encoding] *configured to encode* said portions of said full dynamic range second chrominance component not provided to said first encoder.

34. The apparatus of claim 28, further comprising:

a decoder, [for decoding] *configured to decode* said encoded low pass filtered first and second chrominance components produced by said first encoder;

a first subtractor, [for substracting] *configured to subtract* said decoded low pass filtered first chrominance component from said full dynamic first chrominance component to produce a first difference component for encoding by said second encoder; and a second subtractor, [for substracting] *configured to subtract* said decoded low pass filtered second chrominance component from said full dynamic second chrominance component to produce a second difference component for encoding by said second encoder.

35. The apparatus of claim 28, wherein said first and second filters comprise low horizontal frequency, low vertical frequency (LL) spatial filters;

said low pass filtered first chrominance component comprises primarily low horizontal frequency and low vertical frequency components of said full dynamic range first chrominance component; and said low pass filtered second chrominance component comprises primarily low horizontal frequency and low vertical frequency components of said full dynamic range second chrominance component.

36. The apparatus of claim 35, further comprising:

a low horizontal frequency, high vertical frequency (LH) spatial filter, [for filtering] *configured to filter* one of said first and second full dynamic range chrominance components to produce first spatially filtered signal;

a high horizontal frequency, low vertical frequency (HL) spatial filter, [for filtering] *configured to filter* said one of said first and second full dynamic range chrominance components to produce a second spatially filtered signal; and first and second frequency downconverters, [for downconverting] *configured to downconvert*, respectively, said first and second spatially filtered signals;

said second compression encoder encoding said other one of said first and second full dynamic range chrominance components, said first spatially filtered signal and said second spatially filtered signal.

37. The apparatus of claim 36, wherein said second compression encoder comprises a relatively high dynamic range encoding channel and two relatively low dynamic range encoding channels, said relatively high dynamic range encoding channel being used to compression encode said other one of said first and second full dynamic range chrominance components, said two relatively low dynamic range encoding channels being used to compression encode, respectively, said first and second spatially filtered signals.

38. [Apparatus, for decoding] *An apparatus configured to decode* a video information stream to recover a video signal, said video information stream comprising a plurality of substantially full dynamic range encoded video signal components, said apparatus comprising:

a demultiplexer, [for extracting] *configured to extract* from said video information stream said plurality of substantially full dynamic range encoded video signal components; and a plurality of standard compression decoders responding to at least inter-frame coding, each standard compression decoder comprising a substantially full dynamic range decoding channel and a plurality of partial dynamic range decoding channels, each standard decoder being associated with a respective substantially full dynamic range encoded video signal component, each standard compression encoder decoding, using said respective substantially full dynamic range decoding channel, said respective substantially full dynamic range encoded video signal component to produce a respective substantially full dynamic range decoded video signal component.

39. The apparatus of claim 38, wherein at least one of said substantially full dynamic range encoded video signal components are encrypted according to one of a watermarking process and an encryption process, said apparatus further comprising:

an encryption decoder, [for decrypting] *configured to decrypt* said at least one encrypted substantially full dynamic range encoded video signal [components]*component*.

40. The apparatus of claim 38, wherein at least one of said substantially full dynamic range decoded video signal components has been subjected to regional map and scale processing to produce a respective remapped component video signal and an associated map region identification stream, said apparatus further comprising:

a respective inverse regional map and scale unit associated with each substantially full dynamic range decoded video signal component that has been subjected to regional map and scale processing;

said inverse regional map and scale unit, in response to intra-region information parameter maxima and minima, inverse remapping one or more relatively high dynamic range information parameters of each information region of said respective substantially full dynamic range decoded video signal component that has been subjected to regional map and scale processing.

41. [Apparatus, for encoding] *An apparatus configured to encode* a video information stream to recover a video signal, said video information stream comprising a substantially full dynamic range compression encoded luminance component, first and second portions of a substantially full dynamic range compression encoded first chrominance component and first and second portions of a substantially full dynamic range compression encoded second chrominance component, said apparatus comprising:

a demultiplexer, [for extracting] *configured to extract* from said video information stream said encoded luminance and chrominance components; and a first compression decoder, [for decoding] *configured to decode* said substantially full dynamic range compression encoded luminance component to recover said luminance component of said video signal, and [for decoding] *configured to decode* said first portions of said substantially full dynamic range compression encoded first and second chrominance components;

a second decoder, [for decoding] *configured to decode* said second portions of said substantially full dynamic range compression encoded first and second chrominance components;

a first adder, [for adding] *configured to add* said decoded first and second portions of said substantially full dynamic range compression encoded first chrominance component to recover said first chrominance component of said video signal; and a second adder, [for adding] *configured to add* said decoded first and second portions of said substantially full dynamic range compression encoded second chrominance component to recover said second chrominance component of said video signal.

42. The apparatus of claim 41, wherein at least one of said substantially full dynamic range compression encoded video signal components are encrypted according to one of a watermarking process and an encryption process, said apparatus further comprising:

an encryption decoder, [for decrypting] *configured to decrypt* said at least one encrypted substantially full dynamic range encoded video signal components.

43. The apparatus of claim 42, wherein at least one of said substantially full dynamic range decoded video signal components has been subjected to regional map and scale processing to produce a respective remapped component video signal and an associated map region identification stream, said apparatus further comprising:

a respective inverse regional map and scale unit associated with each substantially full dynamic range decoded video signal component that has been subjected to regional map and scale processing;

said inverse regional map and scale unit, in response to intra-region information parameter maxima and minima, inverse remapping one or more relatively high dynamic range information parameters of each information region of said respective substantially full dynamic range decoded video signal component that has been subjected to regional map and scale processing.

44. The apparatus of claim 41, wherein:

said first portions of said substantially full dynamic range encoded first and second chrominance components comprise relatively low frequency portions of said first and second chrominance components of said video signal; and said second portions of said substantially full dynamic range compression encoded first and second chrominance components comprise relatively high frequency portions of said first and second chrominance components of said video signal.

45. [Apparatus, for decoding] *An apparatus configured to decode* a video information stream to recover a video signal, said video information stream comprising a substantially full dynamic range compression encoded luminance component, a substantially full dynamic range compression encoded first chrominance component and a plurality of portions of a compression encoded second chrominance component, said apparatus comprising:

a demultiplexer, [for extracting] *configured to extract* from said video information stream said compression encoded luminance and chrominance components; and a first decoder, [for decoding] *configured to decode* said substantially full dynamic range compression encoded luminance component to recover said luminance component of said video signal, and [for decoding] *configured to decode* at least one of said plurality of portions of said compression encoded second chrominance component;

a second decoder, [for decoding] *configured to decode* said substantially full dynamic range compression encoded first chrominance component to recover said first chrominance component of said video signal, and [for decoding] *configured to decode* remaining portions of said plurality of portions of said compression encoded second chrominance component; and means for combining said decoded portions encoded second chrominance component to recover said second chrominance component of said video signal.

46. The apparatus of claim 45, wherein said plurality of portions said compression encoded second chrominance component comprises a low horizontal and low vertical frequency portion (LL), a low horizontal and high vertical frequency portion (LH) and high horizontal and low vertical frequency portion (HL).

47. The apparatus of claim 46, wherein each of said portions of said compression encoded second chrominance component have been spectrally shifted to a relatively low horizontal and low vertical frequency (LL) region, and wherein said combining means comprises:

a first frequency converter, [for] *configured to* spectrally [shifting] *shift* said decoded LH portion of said second chrominance component from said LL region to an LH region;

a second frequency converter, [for] *configured to* spectrally [shifting] *shift* said decoded HL portion of said second chrominance component from said LL region to an HL region; and an adder, [for combining] *configured to combine* said decoded LL, said decoded and frequency converted LH and said decoded and frequency converted HL portions of said second chrominance component to recover said second chrominance component of said video signal.

48. In a system for distributing a video information signal comprising a plurality of full dynamic range components, a method comprising the steps of:

compression encoding, using at least two standard encoders providing at least inter-frame coding, each of said plurality of full dynamic range components of said video signal in a manner substantially preserving said full dynamic range of said components of said video signal, each of said standard encoders being responsive to up to three component video signals, each of said standard compression encoders tending to substantially preserve a dynamic range and spatial resolution of one component of said video signal, each of said standard compression encoders providing a compressed output video signal; and multiplexing said compressed output video signals of said two or more standard compression encoders to produce a multiplexed information stream;

each of said standard encoders being responsive to up to three component video signals, each of said standard compression encoders tending to substantially preserve a dynamic range and spatial resolution of one component of said video signal.

49. The method of claim 48, further comprising the step of:

encrypting at least one of said compressed output video signals of said two or more standard compression encoders according to one of a watermarking process and an encryption process.

50. The method of claim 48, further comprising the steps of:

demultiplexing said multiplexed information stream to retrieve said compressed output video signals of said two or more standard compression encoders; and compression decoding, using at least two standard decoders, said retrieved compressed output video signals of said two or more standard compression encoders to produce a retrieved video information signal, each of said standard decoders receiving a respective one of said retrieved compressed output video signals, each of said standard compression decoders being responsive to up to three component video signals within said respective one compressed video signal, each of said standard compression decoders tending to substantially preserve a dynamic range and spatial resolution of one component within said respective one compressed video signal.

51. The method of claim 49, further comprising the steps of:

demultiplexing said multiplexed information stream to retrieve said compressed output video signals of said two or more standard compression encoders;

decrypting said at least one encrypted and compressed output video signal; and compression decoding, using at least two standard decoders, said retrieved unencrypted and decrypted compressed output video signals of said two or more standard compression encoders to produce a retrieved video information signal, each of said standard decoders receiving a respective one of said retrieved compressed output video signals, each of said standard compression decoders being responsive to up to three component video signals within said respective one compressed video signal, each of said standard compression decoders tending to substantially preserve a dynamic range and spatial resolution of one component within said respective one compressed video signal.

*52. A system for compressing a video signal, comprising:*

*a first video signal compression encoder configured to inter-frame compression encode a first component signal of a first color representation signal standard at a full resolution and a second component signal of the first color representation signal standard at a partial resolution, to receive a first component signal of a second color representation signal standard of the video signal at a port for the first component signal of the first color representation signal standard, and to produce a compression encoded first component signal of the second color representation signal standard of the video signal;*

*a second video signal compression encoder configured to inter-frame compression encode the first component signal of the first color representation signal standard at the full resolution and the second component signal of the first color representation signal standard at the partial resolution, to receive a second component signal of the second color representation signal standard of the video signal at the port for the first component signal of the first color representation signal standard, and to produce a compression encoded second component signal of the second color representation signal standard of the video signal; and*

*a multiplexer configured to receive the compression encoded first component signal of the second color representation signal standard of the video signal and the compression encoded second component signal of the second color representation signal standard of the video signal and to produce a compressed video signal.*

*53. A system for decompressing a video signal, comprising:*

*a demultiplexer configured to receive the video signal and to produce a compression encoded first component signal of a first color representation signal standard of the video signal and a compression encoded second component signal of the first color representation signal standard of the video signal;*

*a first video signal compression decoder configured to inter-frame compression decode a first component signal of a second color representation signal standard at a full resolution and a second component signal of the second color representation signal standard at a partial resolution, to receive the compression encoded first component signal of the first color representation signal standard of the video signal at a port for the first component signal of a second color representation signal standard, and to produce a decompressed first component signal of the first color representation signal standard of the video signal; and*

*a second video signal compression decoder configured to inter-frame compression decode the first component signal of the second color representation signal standard at the full resolution and the second component signal of the second color representation signal standard at the partial resolution, to receive the compression encoded second component signal of the first representation signal standard of the video signal at the port for the first component signal of the second color representation signal standard, and to produce a decompressed second component signal of the first color representation signal standard of the video signal.*

*54. A method for processing a video information signal comprising a plurality of full dynamic range components, said method comprising:*

*compression encoding said video information signal in a manner substantially retaining said full dynamic range of said full dynamic range components using a compression encoder providing at least inter-frame coding, said compression encoder comprising at least two standard encoders, each of said standard encoders being responsive to up to three component video signals, each of said standard compression encoders tending to substantially preserve a dynamic range and spatial resolution of one component of said video signal, each of said standard compression encoders providing a compressed output video signal; and*

*multiplexing said compressed output video signals of said two or more standard compression encoders to produce a multiplexed information stream.*

*55. The method of claim 54, further comprising:*

*encrypting at least one of said compressed output video signals of said two or more standard compression encoders according to one of a watermarking process and an encryption process.*

*56. A method for processing a video information signal comprising a plurality of full dynamic range components, said method comprising:*

*demultiplexing said multiplexed information stream to retrieve said compressed output video signals of said two or more standard compression encoders; and*

*compression decoding using a decompression decoder said retrieved compressed output video signals of said two or more standard compression encoders to produce a retrieved video information signal, said compression decoder comprising at least two standard decoders, each of said standard decoders receiving a respective one of said retrieved compressed output video signals, each of said standard compression decoders being responsive to up to three component video signals within said respective one compressed video signal, each of said standard compression decoders tending to substantially preserve a dynamic range and spatial resolution of one component within said respective one compressed video signal.*

*57. The method of claim 56, further comprising:*

*decrypting at least one of said compressed output video signals of said two or more standard compression decoders according to one of a watermarking process and a decryption process.*

*58. The method of claim 56, further comprising:*

*transport encoding said multiplexed information stream to produce a transport encoded information stream;*

*transporting said transport encoded information stream; and*

*retrieving said multiplexed information stream from said transport encoded information stream.*

*59. The method of claim 57, further comprising:*

*storing one or more multiplexed information streams;*

*transport encoding said one or more multiplexed information streams to produce a transport encoded information stream;*

*transporting said transport encoded information stream;*

*retrieving said one or more multiplexed information streams from said transport encoded information stream; and*

*storing said retrieved one or more multiplexed information streams.*

*60. The method of claim 58, further comprising:*

*demultiplexing said multiplexed information stream to retrieve said compressed output video signals of said two or more standard compression encoders; and*

*compression decoding using a compression decoder said retrieved compressed output video signals of said two or more standard compression encoders to produce a retrieved video information signal by receiving a respective one of said retrieved compressed output video signals, each of said standard compression decoders being responsive to up to three component video signals within said respective one compressed video signal, each of said standard compression decoders tending to substantially preserve a dynamic range and spatial resolution of one component within said respective one compressed video signal.*

*61. The method of claim 59, further comprising:*

*demultiplexing said multiplexed information stream to retrieve said compressed output video signals of said two or more standard compression encoders; and*

*compression decoding using a compression decoder said retrieved compressed output video signals of said two or more standard compression encoders to produce a retrieved video information signal, said compression decoder comprising at least two standard decoders, each of said standard decoders receiving a respective one of said retrieved compressed output video signals, each of said standard compression decoders being responsive to up to three component video signals within said respective one compressed video signal, each of said standard compression decoders tending to substantially preserve a dynamic range and spatial resolution of one component within said respective one compressed video signal.*

*62. The method of claim 60, further comprising displaying said retrieved video information signal.*

*63. The method of claim 54, further comprising:*

*demultiplexing said multiplexed information stream to retrieve said compressed output video signals of said two or more standard compression encoders; and*

*compression decoding, using one or more compression decoders, respective retrieved compressed output video signals of said two or more standard compression encoders to produce respective retrieved video informa-*

*tion signals, said one or more compression decoders each comprising at least two standard decoders, each of said standard decoders receiving a respective one of said retrieved compressed output video signals, each of said standard compression decoders being responsive to up to three component video signals within said respective one compressed video signal, each of said standard compression decoders tending to substantially preserve a dynamic range and spatial resolution of one component within said respective one compressed video signal.*

*64. The method of claim 63, further comprising displaying said retrieved video information signal.*

*65. The method of claim 54, wherein said compression encoding further comprises segmenting a component video signal into one or more information regions;*

*remapping one or more relatively high dynamic range information parameters associated with each information region according to respective intra-region information parameter maxima and minima to produce a remapped component video signal and an associated map region identification stream, said one or more remapped information parameters having a relatively low dynamic range; and*

*compression encoding said remapped information stream to produce a compression encoded information stream.*

*66. The method of claim 65, further comprising:*

*transport encoding said compression encoded information stream and said map region identification stream to produce a transport stream.*

*67. The method of claim 66, further comprising:*

*transport decoding said transport stream to recover said compression encoded information stream and said associated map region identification stream;*

*compression decoding said recovered compression encoded information stream to recover said remapped information stream; and*

*inverse remapping said recovered remapped information stream according to said associated map region identification stream to substantially recover said information stream.*

*68. The method of claim 66, wherein said information stream comprises at least a video information stream.*

*69. The method of claim 65, wherein:*

*said regional map and scale unit imparts a transfer characteristic to said remapped information stream comprising at least one of a gamma correction characteristic, a companding characteristic, a statistical redistribution characteristic, a simple linear characteristic, an arbitrary polynomial characteristic and a pre-determined function characteristic.*

*70. The method of claim 65, wherein each information region is defined with respect to one of a picture, frame, field, slice, macroblock, block, pixel location, and motion vector.*

*71. The method of claim 54, wherein said compression encoding comprises:*

*encoding a luminance component of said video signal in a manner substantially preserving a dynamic range and spatial resolution of said luminance component;*

*encoding a first chrominance component of said video signal in a manner substantially preserving a dynamic range and spatial resolution of said first chrominance component; and*

*encoding a second chrominance component of said video signal in a manner substantially preserving a dynamic range and spatial resolution of said second chrominance component.*

*72. The method of claim 71, wherein said compression decoding comprises:*

*decoding said luminance component of said video signal in a manner substantially preserving said dynamic range and spatial resolution of said luminance component;*

*decoding said first chrominance component of said video signal in a manner substantially preserving said dynamic range and spatial resolution of said first chrominance component; and*

*decoding said second chrominance component of said video signal in a manner substantially preserving said dynamic range and spatial resolution of said second chrominance component.*

*73. A method for processing a video signal, said video signal comprising a luminance component, a first color component and a second color component, said video signal components having respective full dynamic ranges, said method comprising:*

*encoding said video signal to produce a first encoded video signal by encoding substantially the entire dynamic range of said luminance component of said video signal, a first portion of said dynamic range of said first color component of said video signal, and a first portion of said dynamic range of said second color component of said video signal; and*

*encoding a second portion of said dynamic range of said first color component of said video signal and a second portion of said dynamic range of said second color component of said video signal.*

*74. The method of claim 73, further comprising:*

*filtering said first color component of said video signal to produce a low pass filtered first color component signal and a high pass filtered first color component signal;*

*filtering said second color component of said video signal to produce a low pass filtered second color component signal and a high pass filtered second color component signal;*

*coupling said low pass filtered first color component signal and said low pass filtered second color component signal being to said first compression encoder as first dynamic range portions of, respectively, said first and second color components of said video signal; and*

*coupling said high pass filtered first color component signal and said high pass filtered second color component signal being to said second compression encoder as second dynamic range portions of, respectively, said first and second color components of said video signal.*

*75. The method of claim 73, further comprising:*

*filtering said first color component of said video signal to produce a low pass filtered first color component signal;*

*coupling said low pass filtered first color component signal being to said first compression encoder as a first dynamic range portion of said first color component of said video signal;*

*filtering said second color component of said video signal to produce a low pass filtered second color component signal; and*

*coupling said low pass filtered second color component signal being to said first compression encoder as a first dynamic range portion of said second color component of said video signal.*

*76. The method of claim 73, wherein said second compression encoder comprises:*

*decoding said first and second color components of said first encoded video signal to produce, respectively, a first decoded color component signal and a second decoded color component signal;*

*subtracting said first decoded color component signal from said first color component of said video signal to produce a first color difference signal;*

*subtracting said second decoded color component signal from said second color component of said video signal to produce a second color difference signal;*

*receiving said first color difference signal at a nominally luminance input;*

*encoding said first color difference signal to produce an encoded first color difference signal;*

*receiving said second color difference signal at a nominally luminance input; and*

*encoding said second color difference signal to produce an encoded second color difference signal.*

*77. The method of claim 73, wherein encoding said video signal to produce a first encoded video signal further comprises:*

*filtering said first color component of said video signal to produce low pass/vertical low pass (LL) filtered first color component signal;*

*coupling said LL filtered first color component signal being to said first compression encoder as a first dynamic range portion of said first color component of said video signal;*

*filtering said second color component of said video signal to produce an LL filtered second color component signal; and*

*coupling said LL filtered second color component signal being to said first compression encoder as a first dynamic range portion of said second color component of said video signal.*

*78. A method for encoding a video signal to produce an encoded video information stream, said video signal comprising a full dynamic range luminance component, a full dynamic range first chrominance component and a full dynamic range second chrominance component, said method comprising;*

*filtering said full dynamic range first chrominance component to produce a low pass filtered first chrominance component;*

*filtering said full dynamic range second chrominance component to produce a low pass filtered second chrominance component;*

*providing at least inter-frame coding for encoding said full dynamic range luminance component;*

*providing a pair of relatively low dynamic range encoding channels for encoding said low pass filtered first and second chrominance components;*

*encoding at least those portions of said full dynamic range first and second chrominance components not provided in said first compression encoder; and*

*multiplexing said encoded video components to produce said encoded video information stream.*

*79. The method of claim 78, further comprising encrypting at least one of said compressed output video component signals according to one of a watermarking process and an encryption process.*

*80. The method of claim 78, wherein said dynamic range of at least one of said full dynamic range components exceeds a dynamic range of said plurality of standard compression encoders, further comprising:*

*providing a respective regional map and scale unit associated with each of said full dynamic range components;*

*segmenting said respective exceeding full dynamic range component into one or more information regions;*

*remapping one or more relatively high dynamic range information parameters associated with each information region according to respective intra-region information parameter maxima and minima to produce a remapped component video signal and an associated map region identification stream, said one or more remapped information parameters having a relatively low dynamic range; and*

*compression encoding said respective remapped information stream to produce a respective compression encoded map information stream.*

*81. A method for encoding a video signal to produce an encoded video information stream, said video signal comprising a full dynamic range luminance component, a full dynamic range first chrominance component and a full dynamic range second chrominance component, said method comprising;*

*using a first filter, responsive to said full dynamic range first chrominance component, to produce a low pass filtered first chrominance component;*

*using a second filter, responsive to said full dynamic range second chrominance component, to produce a low pass filtered second chrominance component;*

*using a first compression encoder providing at least inter-frame coding and comprising a relatively high dynamic range encoding channel to encode said full dynamic range luminance component and said low pass filtered first and second chrominance components;*

*using a second compression encoder to encode at least those portions of said full dynamic range first and second chrominance components not encoded using said first compression encoder; and*

*multiplexing said encoded video components to produce said encoded video information stream.*

*82. The method of claim 81, further comprising encrypting at least one of said compressed output video component signals according to one of a watermarking process and an encryption process.*

*83. The method of claim 81, wherein said dynamic range of at least one of said full dynamic range components exceeds a dynamic range of said plurality of standard compression encoders, said method further comprising:*

*providing a respective regional map and scale unit associated with each of said exceeding full dynamic range components;*

*segmenting said respective exceeding full dynamic range component into one or more information regions;*

*remapping one or more relatively high dynamic range information parameters associated with each information region according to respective intra-region information parameter maxima and minima to produce a remapped component video signal and an associated map region identification stream, said one or more remapped information parameters having a relatively low dynamic range; and*

*compression encoding said respective remapped information stream to produce a respective compression encoded map information stream.*

*84. The method of claim 81, further comprising:*

*filtering said full dynamic range first chrominance component to produce a high pass filtered first chrominance component; and*

*filtering said full dynamic range second chrominance component to produce a high pass filtered second chrominance component; wherein said high pass filtered first*

*chrominance component and said high pass filtered second chrominance component comprises said portions of said full dynamic range first and second chrominance components not encoded by said first compression encoder.*

*85. A method for compressing a video signal, comprising:*

*inter-frame compression encoding a first component signal of a first color representation signal standard at a full resolution and a second component signal of the first color representation signal standard at a partial resolution;*

*receiving a first component signal of a second color representation signal standard of the video signal at a port for the first component signal of the first color representation signal standard;*

*producing a compression encoded first component signal of the second color representation signal standard of the video signal;*

*inter-frame compression encoding the first component signal of the first color representation signal standard at the full resolution and the second component signal of the first color representation signal standard at the partial resolution;*

*receiving a second component signal of the second color representation signal standard of the video signal at the port for the first component signal of the first color representation signal standard;*

*producing a compression encoded second component signal of the second color representation signal standard of the video signal; and*

*multiplexing the compression encoded first component signal of the second color representation signal standard of the video signal with the compression encoded second component signal of the second color representation signal standard of the video signal to produce a compressed video signal.*

*86. A method for decompressing a video signal, comprising:*

*demultiplexing the video signal to produce a compression encoded first component signal of a first color representation signal standard of the video signal and a compression encoded second component signal of the first color representation signal standard of the video signal;*

*inter-frame compression decoding a first component signal of a second color representation signal standard at a full resolution and a second component signal of the second color representation signal standard at a partial resolution;*

*receiving the compression encoded first component signal of the first color representation signal standard of the video signal at a port for the first component signal of a second color representation signal standard;*

*producing a decompressed first component signal of the first color representation signal standard of the video signal; and*

*inter-frame compression decoding the first component signal of the second color representation signal standard at the full resolution and the second component signal of the second color representation signal standard at the partial resolution;*

*receiving the compression encoded second component signal of the first representation signal standard of the video signal at the port for the first component signal of the second color representation signal standard; and*

*producing a decompressed second component signal of the first color representation signal standard of the video signal.*

* * * * *

UNITED STATES PATENT AND TRADEMARK OFFICE

CERTIFICATE OF CORRECTION

PATENT NO. : RE42,589 E
APPLICATION NO. : 11/635063
DATED : August 2, 2011
INVENTOR(S) : Tinker et al.

It is certified that error appears in the above-identified patent and that said Letters Patent is hereby corrected as shown below:

On the Title page, item (63 and 60), under "Related U.S. Patent Documents", Lines 6-11, delete "U.S. Applications:
(63) Continuation-in-part of application No. 09/050,304, filed on Mar. 30, 1998, now Pat. No. 6,118,820.
(60) Provisional application No. 60/071,296, filed on Jan. 16, 1998, provisional application No. 60/071,294, filed on Jan. 16, 1998." and
insert -- U.S. Applications:
(63) Continuation-in-part of application No. 09/050,304, filed on Mar. 30, 1998, now Pat. No. 6,118,820.
(60) Provisional application No. 60/071,296, filed on Jan. 16, 1998, provisional application No. 60/071,294, filed on Jan. 16, 1998, provisional application No. 60/079,824, filed Mar. 30, 1998. --.

Column 22, line 7, in Claim 5, delete "claim [4]2," and insert -- claim 4, --.

Column 22, line 41, in Claim 7, delete "respective one" and insert -- respective one *compressed video signal* --.

Column 22, line 60, in Claim 8, delete "respective one" and insert -- respective one *compressed video signal* --.

Column 23, line 17, in Claim 10, delete "respective one" and insert -- respective one *compressed video signal* --.

Column 25, line 48, in Claim 23, delete "substracting]" and insert -- subtracting] --.

Column 25, line 52, in Claim 23, delete "substracting]" and insert -- subtracting] --.

Column 27, line 3, in Claim 28, delete "comprising;" and insert -- comprising: --.

Signed and Sealed this
Eighth Day of May, 2012

David J. Kappos

David J. Kappos
*Director of the United States Patent and Trademark Office*

Column 27, lines 35-37, in Claim 30, delete "each of said exceeding full dynamic range components, [for segmenting] *configured to segment* said respective exceeding full dynamic range component" and insert -- each of said [exceeding] full dynamic range components *exceeding said dynamic range*, [for segmenting] *configured to segment* said [respective exceeding] full dynamic range components *exceeding said dynamic range* --.

Column 28, line 14, in Claim 34, delete "substracting]" and insert -- subtracting] --.

Column 28, line 19, in Claim 34, delete "substracting]" and insert -- subtracting] --.

Column 28, line 40, in Claim 36, delete "produce" and insert -- produce a --.

Column 28, line 49, in Claim 36, delete "encoder encoding said other one" and insert -- encoder *configured to encode* [encoding] said [other] one --.

Column 29, line 1, in Claim 38, delete "*ex tract*" and insert -- *extract* --.

Column 29, lines 45-46, in Claim 41, delete "[Apparatus, for encoding] *An apparatus configured to encode*" and insert -- "[Apparatus, for decoding] *An apparatus configured to decode* --.

Column 30, line 2, in Claim 41, delete "full" and insert -- [fill] *full* --.

Column 31, lines 5-6, in Claim 45, delete "said decoded portions encoded second chrominance component" and insert -- [said] *the* decoded portions [encoded second chrominance component] --.

Column 31, line 20, in Claim 47, delete "said" and insert -- [said] *a* --.

Column 31, line 24, in Claim 47, delete "said" and insert -- [said] *a* --.

Column 31, lines 27-29, in Claim 47, delete "said decoded LL, said decoded and frequency converted LH and said decoded and frequency converted HL portions" and insert -- [said] *a* decoded LL, said *spectrally shifted* decoded [and frequency converted] LH *portion* and said *spectrally shifted* decoded [and frequency converted] HL portion[s] --.

Column 33, lines 51-54, in Claim 56, delete "*demultiplexing said multiplexed information stream to retrieve said compressed output video signals of said two or more standard compression encoders; and compression decoding using a decompression*" and insert -- *demultiplexing a multiplexed information stream to retrieve compressed output video signals of two or more standard compression encoders; and compression decoding using a compression* --.

Column 33, lines 59-60, in Claim 56, delete "*respective one*" and insert -- *respective one compressed video signal* --.

Column 34, lines 6-12, in Claim 58, delete "*The method of claim 56, further comprising: transport encoding said multiplexed information stream to produce a transport encoded information stream; transporting said transport encoded information stream; and retrieving said multiplexed information stream from said transport encoded information stream.*" and insert -- *The method of claim 56, further comprising retrieving said multiplexed information stream from said transport encoded information stream.* --.

Column 34, lines 31-32, in Claim 60, delete "*respective one*" and insert -- *respective one compressed video signal* --.

Column 34, lines 49-50, in Claim 61, delete "*respective one*" and insert -- *respective one compressed video signal* --.

Column 35, line 3, in Claim 63, delete "*respective one*" and insert -- *respective one compressed video signal* --.

Column 36, lines 39-40, in Claim 74, delete "*signal being to*" and insert -- *signal to* --.

Column 36, line 45, in Claim 74, delete "*signal being to*" and insert -- *signal to* --.

Column 36, lines 51-52, in Claim 75, delete "*signal being to*" and insert -- *signal to* --.

Column 36, line 59, in Claim 75, delete "*signal being to*" and insert -- *signal to* --.

Column 36, lines 62-63, in Claim 76, delete "*wherein said second compression encoder comprises:*" and insert -- *wherein said encoding a second portion comprises:* --.

Column 37, line 20, in Claim 77, delete "*produce*" and insert -- *produce a* --.

Column 37, lines 29-30, in Claim 77, delete "*signal being to*" and insert -- *signal to* --.

Column 37, line 39, in Claim 78, delete "*comprising;*" and insert -- *comprising:* --.

Column 38, line 18, in Claim 81, delete "*comprising,*" and insert -- *comprising:* --.

Column 38, lines 46-49, in Claim 83, delete "*with each of said exceeding full dynamic range components; segmenting said respective exceeding full dynamic range component into one or more information regions;*" and insert -- *with each of said full dynamic range components exceeding said dynamic range; segmenting said full dynamic range component exceeding said dynamic range components into one or more information regions;* --.

Column 40, line 21, in Claim 86, delete "*signal; and*" and insert -- *signal;* --.